(12) United States Patent
Fukutomi et al.

(10) Patent No.: US 7,870,296 B2
(45) Date of Patent: Jan. 11, 2011

(54) HIGH AVAILABILITY SYSTEM AND EXECUTION STATE CONTROL METHOD

(75) Inventors: Kazuhiro Fukutomi, Yokohama (JP); Tetsuro Kimura, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 140 days.

(21) Appl. No.: 12/407,223

(22) Filed: Mar. 19, 2009

(65) Prior Publication Data
US 2010/0023667 A1 Jan. 28, 2010

(30) Foreign Application Priority Data
Jul. 23, 2008 (JP) ............................. 2008-190021

(51) Int. Cl.
*G06F 15/16* (2006.01)
(52) U.S. Cl. .......................... 709/248; 709/224; 714/1; 718/1
(58) Field of Classification Search ................. 709/223, 709/224, 248; 714/1; 718/1
See application file for complete search history.

(56) References Cited
U.S. PATENT DOCUMENTS

| | | | |
|---|---|---|---|
| 5,488,716 A * | 1/1996 | Schneider et al. ............. 714/10 |
| 2006/0123416 A1 * | 6/2006 | Cibrario Bertolotti et al. .. 718/1 |
| 2007/0156969 A1 * | 7/2007 | Tian et al. .................... 711/141 |
| 2007/0239804 A1 * | 10/2007 | Armstrong et al. .......... 707/204 |
| 2008/0201711 A1 * | 8/2008 | Amir Husain .................. 718/1 |
| 2009/0172661 A1 * | 7/2009 | Zimmer et al. ................. 718/1 |
| 2009/0183173 A1 * | 7/2009 | Becker et al. ................ 719/313 |
| 2009/0210888 A1 * | 8/2009 | Lee et al. ..................... 719/321 |
| 2009/0240904 A1 * | 9/2009 | Austruy et al. .............. 711/162 |
| 2009/0292858 A1 * | 11/2009 | Lambeth et al. ................ 711/6 |
| 2009/0313447 A1 * | 12/2009 | Nguyen et al. .............. 711/162 |
| 2009/0319580 A1 * | 12/2009 | Lorenz et al. ............... 707/203 |
| 2010/0235836 A1 * | 9/2010 | Bratanov ........................ 718/1 |

OTHER PUBLICATIONS

T.C. Bressoud et al., "Hypervisor-Based Fault-Tolerance," ACM Trans. on Computer Systems, vol. 14, No. 1, Feb. 1996, pp. 80-107.
U.S. Appl. No. 12/233,461, filed Sep. 18, 2008, Kimura.

* cited by examiner

*Primary Examiner*—Oanh Duong
(74) *Attorney, Agent, or Firm*—Ohlandt, Greeley, Ruggiero & Perle, L.L.P.

(57) ABSTRACT

A high availability system includes a first server computer for a first virtual computer and a first hypervisor and a second server computer for a second virtual computer and a second hypervisor. The first virtual computer executes a processing and the second virtual computer executes the processing behind from the first virtual computer. Information associated with an event is transmitted. The event provides an input to the first virtual computer. In the second hypervisor, a control unit performs, control based on the information to match the execution state of the second virtual computer and that of the first virtual computer, and control associated with the information, when the event associated with the information is predetermined one of an I/O completion interrupt from the first virtual storage and an interrupt handler call corresponding to the interrupt, after the interrupt from the second virtual storage corresponding to the interrupt is caught.

20 Claims, 16 Drawing Sheets

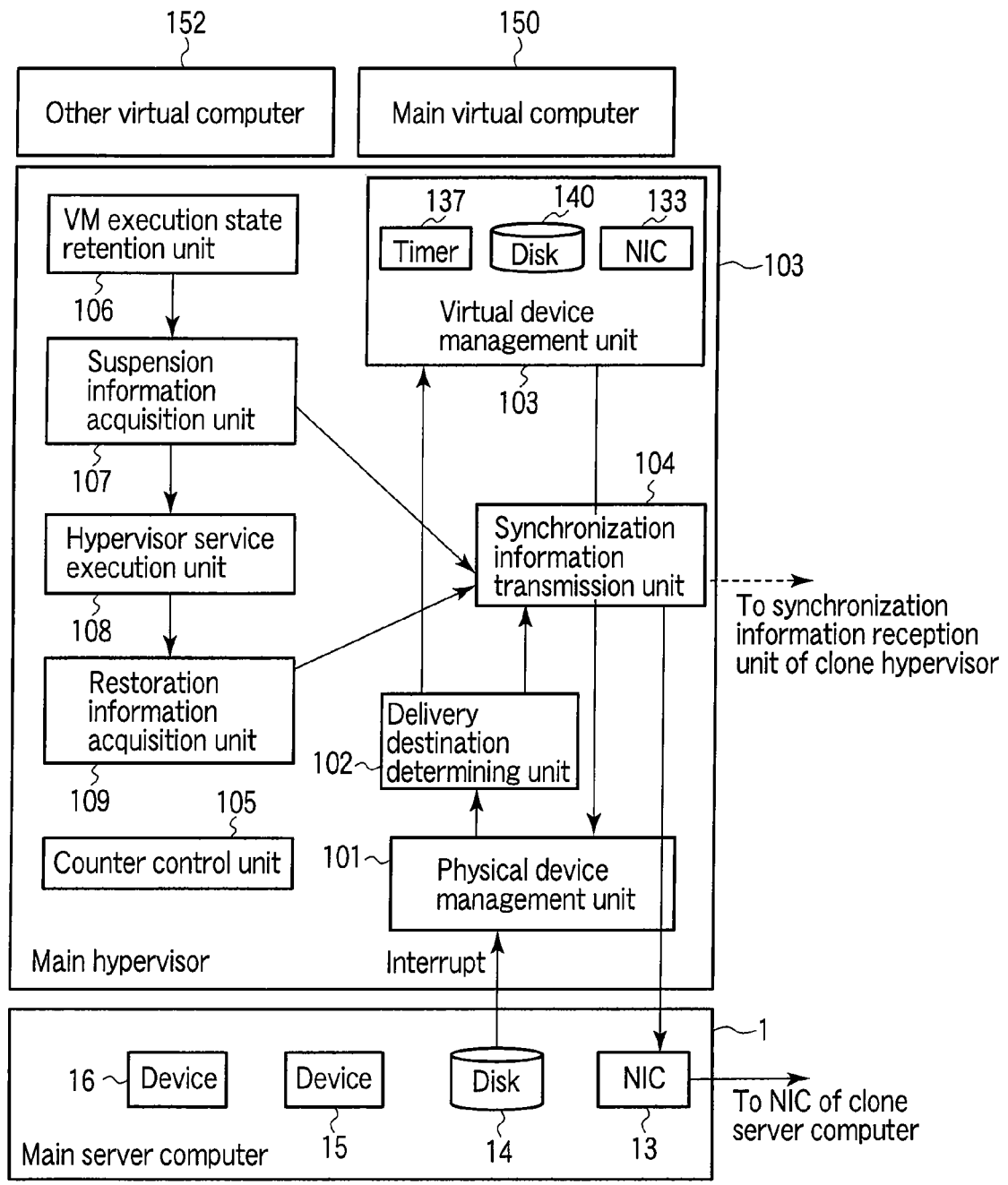
F I G. 2

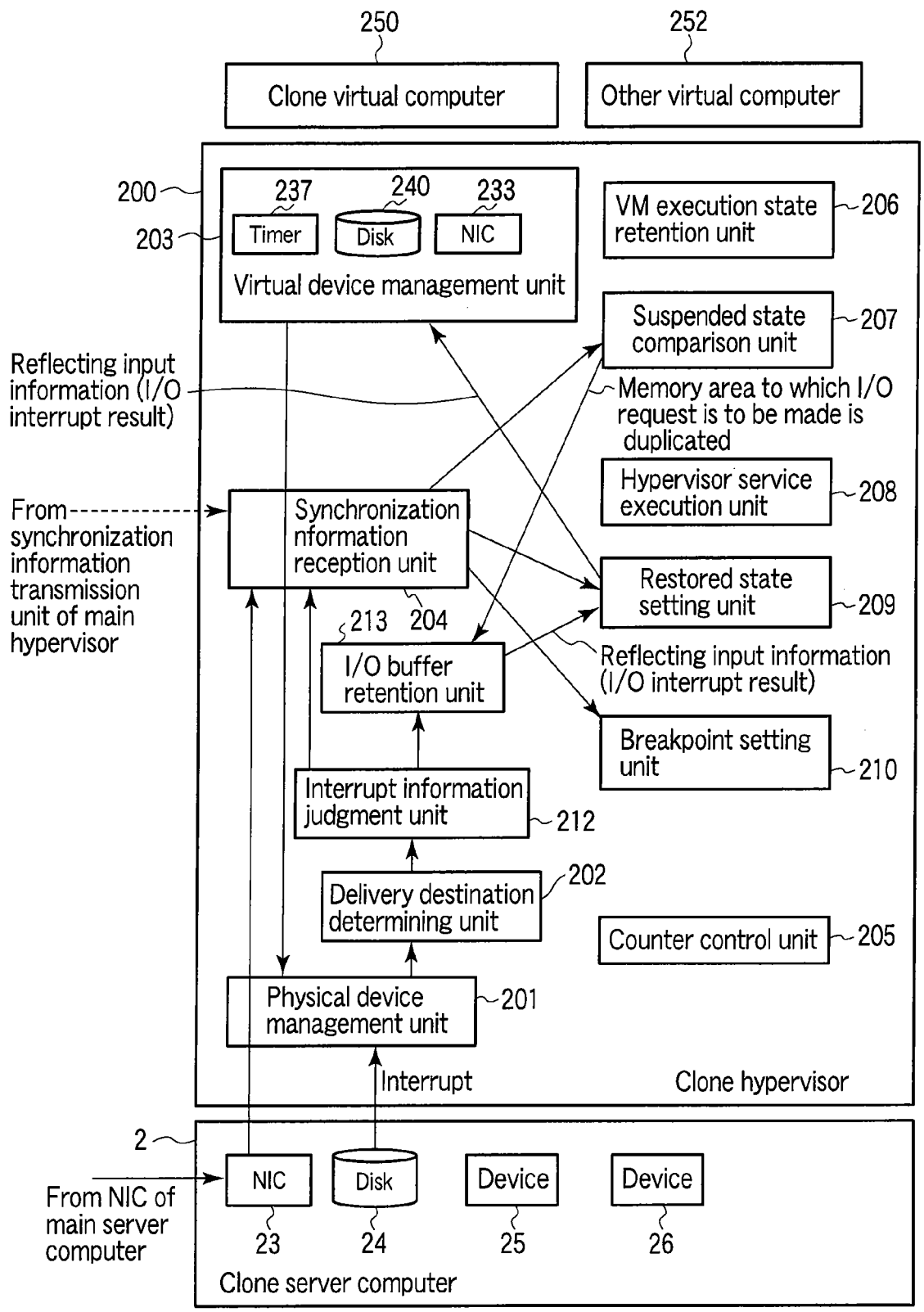
F I G. 3

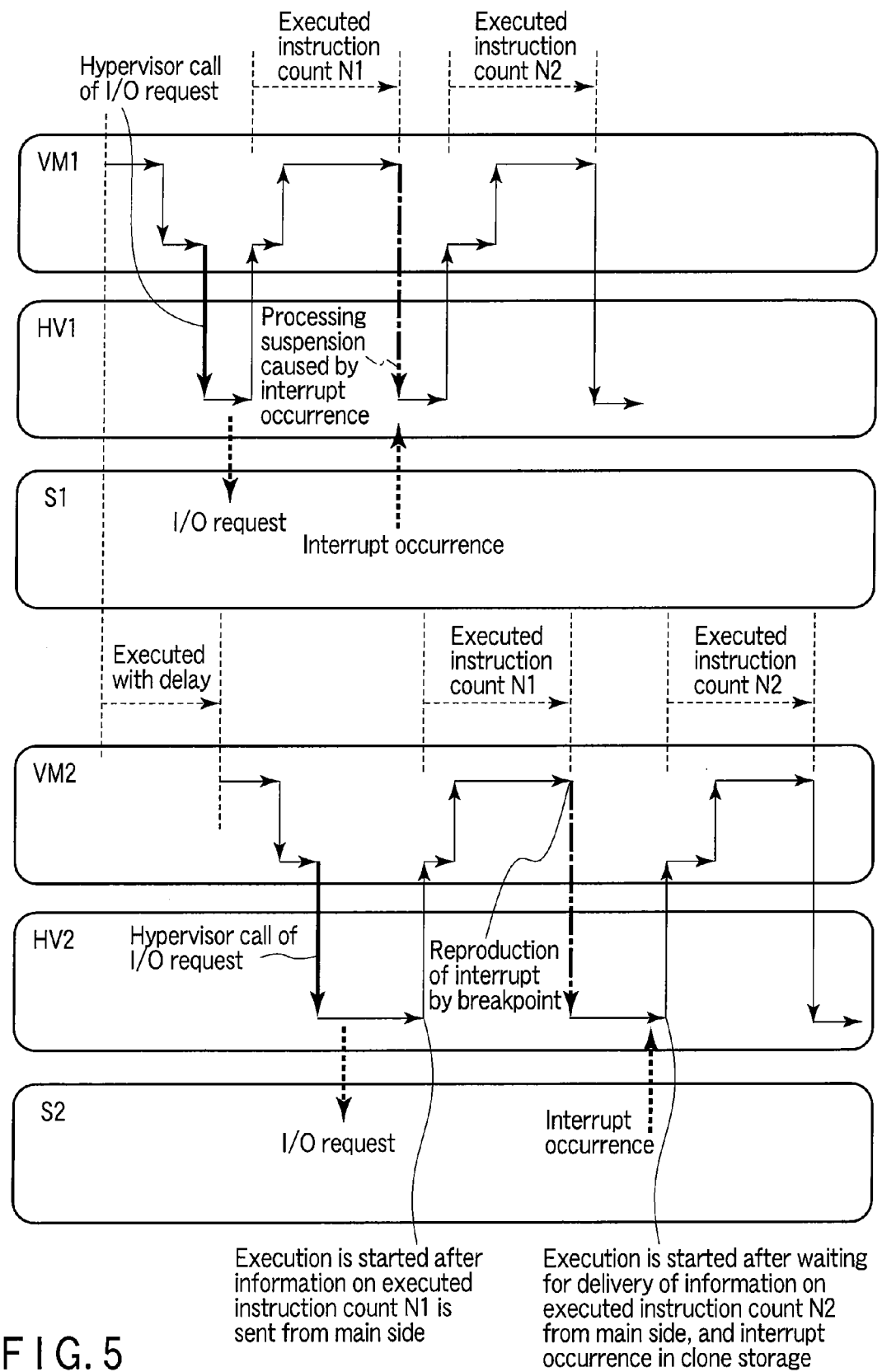
F I G. 5

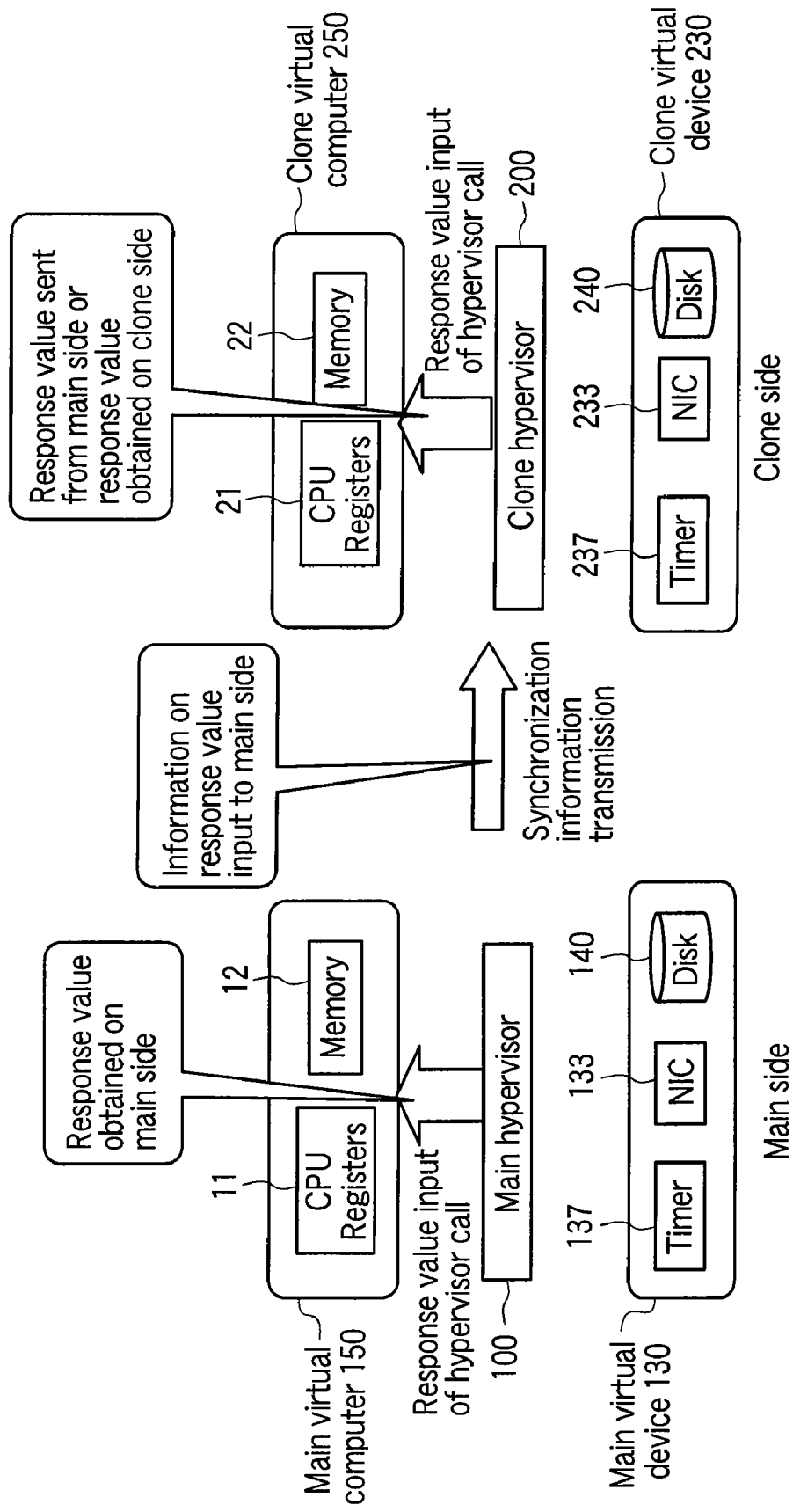
F I G. 10

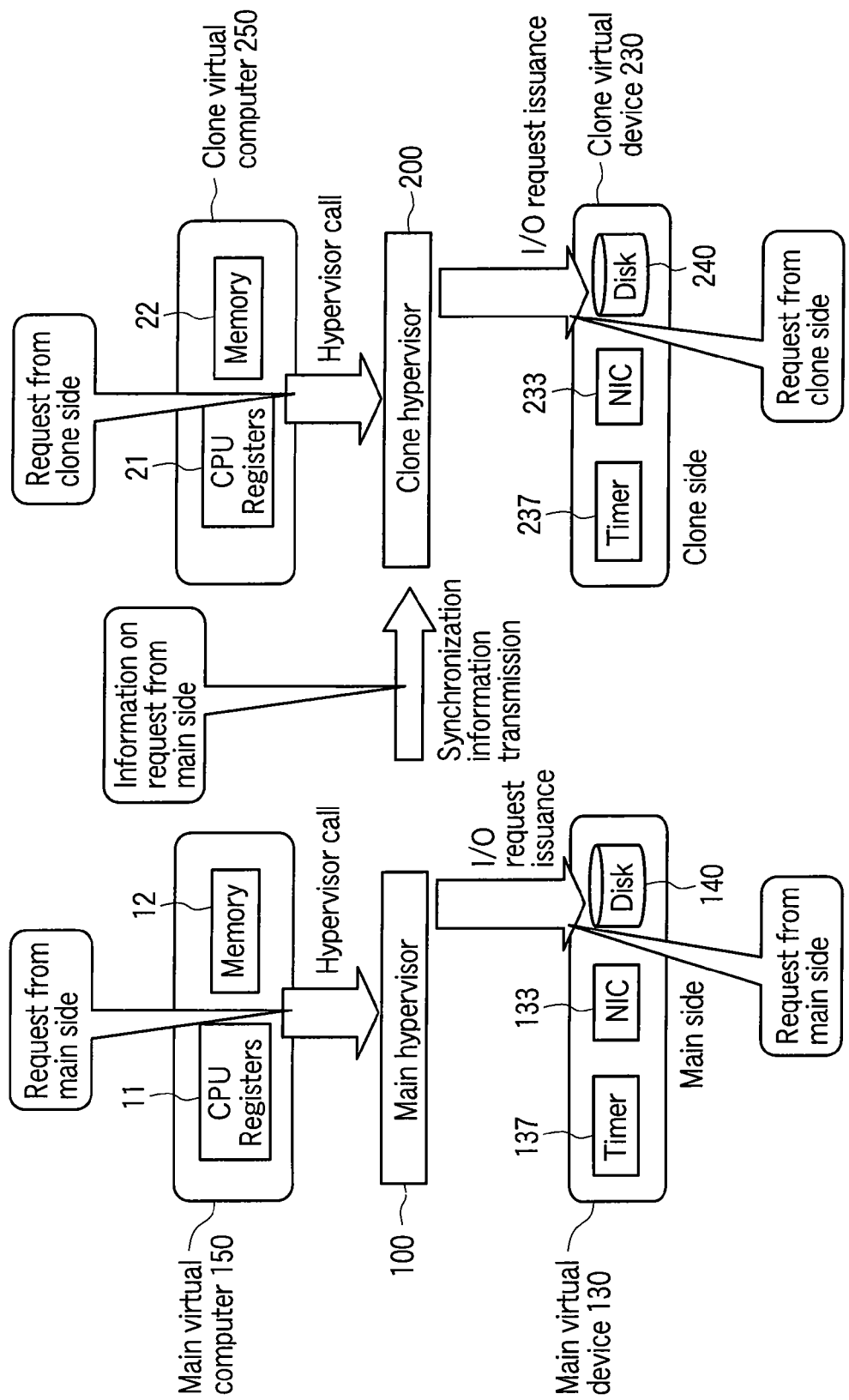
F I G. 12

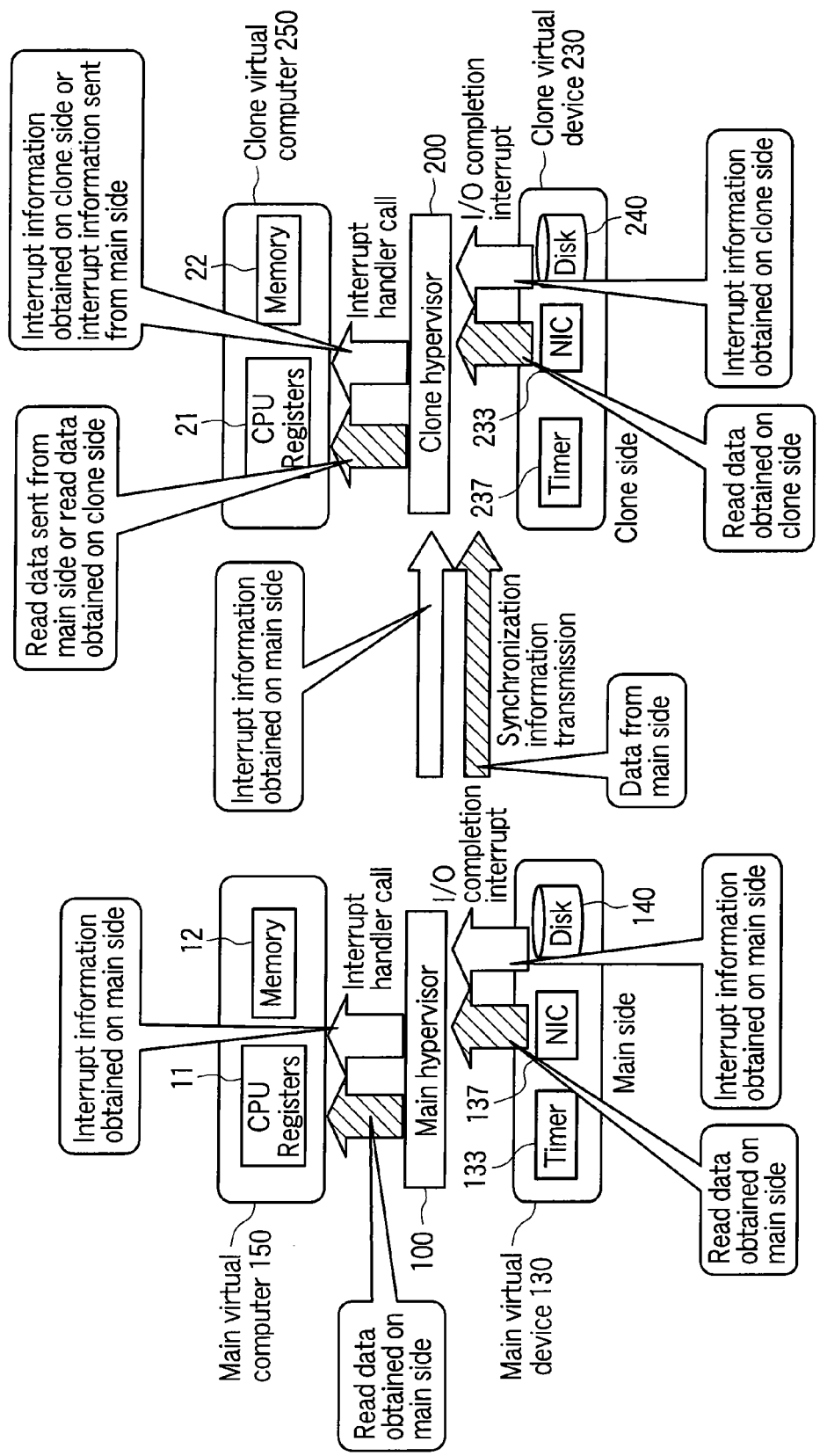
F I G. 14

HIGH AVAILABILITY SYSTEM AND EXECUTION STATE CONTROL METHOD

CROSS-REFERENCE TO RELATED APPLICATIONS

This application is based upon and claims the benefit of priority from prior Japanese Patent Application No. 2008-190021, filed Jul. 23, 2008, the entire contents of which are incorporated herein by reference.

BACKGROUND OF THE INVENTION

1. Field of the Invention

The present invention relates to a high availability system to which a duplexing technique is applied and an execution state control method for the system.

2. Description of the Related Art

A conventional high availability system (fault tolerant system) is constructed by using dedicated hardware, and hence the cost of the hardware is high, which constitutes a barrier to introduction of the high availability system.

It is possible to operate a virtual machine (virtual computer) on a virtual machine monitor (hypervisor) by the virtual technique.

It is possible to construct a high availability system on general hardware by operating a plurality of virtual computers by means of the virtual technique while synchronizing execution states of the virtual computers with each other. This makes it possible to lower the hurdle for the introduction of the high availability system.

In U.S. Pat. No. 5,488,716, the main side and clone side in a high availability system share a storage with each other. However, in U.S. Pat. No. 5,488,716, it is conceivable that use of a shared storage having high fault tolerance is premised, and hence when a malfunction occurs in the storage, the system is brought into a state where the system is unable to operate as a whole. Further, when a shared storage having the high fault tolerance is used, it is particularly necessary to use a shared storage, and an apparatus to be comparable with the shared storage, and hence the cost is increased.

Heretofore, a configuration in which a virtual computer on the main side, and a virtual computer on the clone side each include a storage independently of each other has been employed, and hence it has been impossible to synchronize execution states of the virtual computer on the main side and the virtual computer on the clone side with each other while making the states of the storages coincide with each other.

BRIEF SUMMARY OF THE INVENTION

The present invention has been contrived in consideration of these circumstances, and an object thereof is to provide a high availability system that realizes duplexing by combining virtual computers operating on two independent computers with each other, employs a configuration in which each of the virtual computer on the main side and the virtual computer on the clone side independently includes a storage, and makes it possible to synchronize execution states of the virtual computer on the main side and the virtual computer on the clone side with each other while making the states of the storages coincide with each other, and an execution state control method.

According to an aspect of the present invention, there is provided a high availability system which includes a first server computer and a second server computer, the first server computer including a first virtual computer which executes a processing and a first hypervisor which manages a first virtual storage and the first virtual computer, and the second server computer including a second virtual computer which executes the processing behind from the first virtual computer and a second hypervisor which manages a second virtual storage and the second virtual computer, and a second hypervisor for managing the second virtual computer and a second virtual storage operate, wherein the first hypervisor includes an acquisition unit configured to acquire synchronization information associated with an event, wherein the event occurs during execution of the processing by the first virtual computer and the event provides an input to the first virtual computer, and a transmission unit configured to transmit the synchronization information to the second hypervisor, and the second hypervisor includes a reception unit configured to receive the synchronization information from the first hypervisor, and a control unit configured to perform control in accordance with the synchronization information in such a manner that the execution state of the second virtual computer associated with an input thereto becomes identical with the execution state of the first virtual computer associated with an input thereto, and the control unit performs control associated with the synchronization information, when the event associated with the synchronization information is predetermined one of an I/O completion interrupt from the first virtual storage, and an interrupt handler call corresponding to the interrupt, after the synchronization information is received, and an I/O completion interrupt from the second virtual storage corresponding to the I/O completion interrupt is caught.

BRIEF DESCRIPTION OF THE SEVERAL VIEWS OF THE DRAWING

FIG. 2 is a view showing a configuration example of functional blocks of a hypervisor in a server computer on the main side.

FIG. 3 is a view showing a configuration example of functional blocks of a hypervisor in a server computer on the clone side.

FIG. 5 is a view for explaining control concerning the interrupt timing for processing by a virtual computer.

FIG. 10 is a view for explaining the processing of issuing an I/O request for write to the storage.

FIG. 12 is a view for explaining the processing of issuing an I/O request for read from the storage.

FIG. 14 is a view for explaining the processing of I/O completion interrupt of read from the storage.

DETAILED DESCRIPTION OF THE INVENTION

An embodiment of the present invention will be described below with reference the accompanying drawings.

Figure 1:
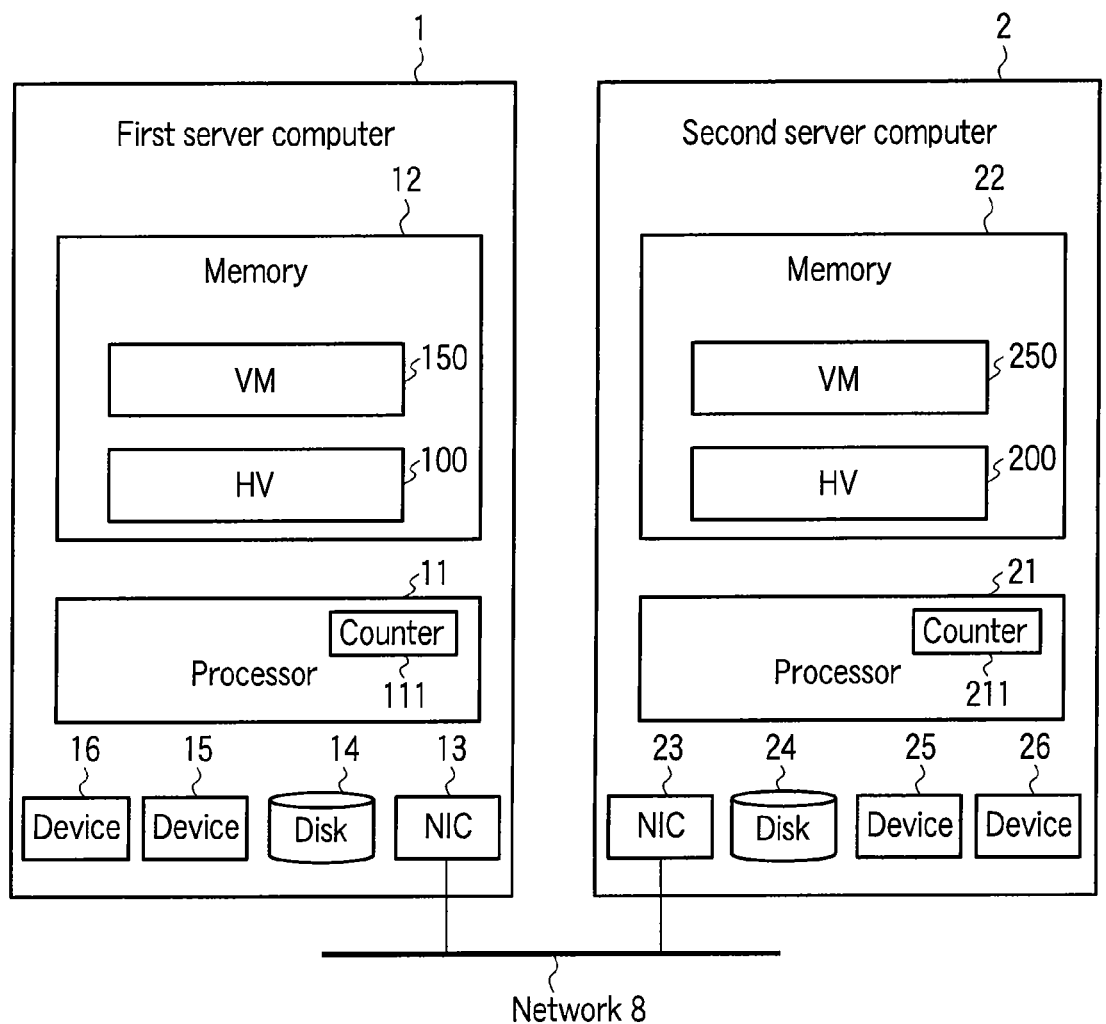
FIG. 1 is a view showing a schematic configuration example of a high availability system according to an embodiment.

FIG. 1 shows a schematic configuration example of a high availability system according to the embodiment.

As shown in FIG. 1, a high availability system of this embodiment includes two server computers 1 and 2.

The first server computer 1 comprises a processor 11, a memory 12, a communication device (NIC (Network Interface Card)) 13 which is a physical device, a storage (Disk) 14 which is a physical device, and other devices (physical devices) 15 and 16. It should be noted that the devices shown in FIG. 1 are merely examples, and the types and number of the devices are arbitrary. In the processor 11, a counter 111 that can be used as a performance counter is present.

Likewise, the second server computer 2 comprises a processor 21, a memory 22, a communication device 23 which is a physical device, a storage (Disk) 24 which is a physical device, and other devices (physical devices) 25 and 26. It should be noted that the devices shown in FIG. 1 are merely examples, and the types and number of the devices are arbitrary. In the processor 21, a counter 211 that can be used as a performance counter is present.

The server computers 1 and 2 can communicate with each other via a predetermined network 8.

In the server computer 1 or 2, the memory 12 or 22 has a memory area 150 or 250 in which program software that operates in a virtual computer (to be also called a virtual machine (VM)) and data are stored, and a memory area 100 or 200 in which programs for a hypervisor (HV) and data are stored. It should be noted that in the virtual computer, an operating system (OS) and an application program (AP) can be operated. The hypervisor (HV) performs processing such as converting input information to the server computer into an input to the virtual computer (VM).

The processor 11 reads out and executes a program stored in the memory area 100 associated with the hypervisor, and also reads out and executes a program in the memory area 150 associated with the virtual computer.

Likewise, the processor 21 reads out and executes a program stored in the memory area 200 associated with the hypervisor, and also reads out and executes a program in the memory area 250 associated with the virtual computer.

The processor 11 or 21 has a plurality of privilege levels. A program for the hypervisor operates at the highest privilege level among the plurality of privilege levels. A program for the virtual computer operates at a privilege level lower than that at which the hypervisor operates. The programs for the virtual computer include an OS and application programs. The OS for the virtual computer operates at a privilege level higher than that at which application programs operate.

When a program for the virtual computer is to perform a process requiring the highest privilege level during its execution, the program calls the hypervisor from the virtual computer and requests the called hypervisor to perform the process. It should be noted that the manner of calling the hypervisor differs depending on whether or not a virtualization support mechanism is incorporated in the processor. When a privileged instruction violation can be caused by a process performed by the OS for the virtual computer, the hypervisor is called by using the privileged instruction violation as a trigger. When no virtualization support mechanism is mounted, a code for calling the hypervisor is inserted into the codes of the OS for the virtual computer. Alternatively, codes are scanned at a proper timing in the interval between the instant a program is loaded into the memory and the instant the program is executed, and a code for calling the hypervisor is inserted. This embodiment can be executed regardless of whether or not a virtualization support mechanism is mounted.

In the following description, in the high availability system shown in FIG. 1, the virtual computer operating on the server computer 1 is regarded as a "main virtual computer", and the virtual computer operating on the server computer 2 is regarded as a "clone virtual computer".

FIG. 2 shows a configuration example of the functional blocks of the hypervisor in the main server computer 1.

Referring to FIG. 2, reference numeral 1 denotes the main server computer; 13, a NIC which is a physical device; 14, a storage (Disk) which is a physical device; 15 and 16, arbitrary physical devices; 100, a main hypervisor; and 150, a main virtual computer.

It should be noted that in FIG. 2, reference numeral 152 denotes the other virtual computer which does not take part in the high availability system. The number of the other virtual computer or computers is arbitrary (it should be noted that there may be a case where the other virtual computer does not exist).

Further, in the main hypervisor 100, reference numeral 101 denotes a physical device management unit; 102, a delivery destination determining unit; 103, a virtual device management unit; 104, a synchronization information transmission unit; 105, a counter control unit; 106, a virtual computer execution state retention unit (VM execution state retention unit); 107, a suspension information acquisition unit; 108, a hypervisor service execution unit; and 109, a restoration information acquisition unit.

Further, in the virtual device management unit 103, reference numerals 133, 137, and 140 respectively denote virtual devices of a NIC, a timer (Timer), and a storage (Disk).

It should be noted that the physical devices and virtual devices shown in FIG. 2 are mere examples, and the types and numbers of the physical devices and virtual devices are arbitrary.

The following is an outline of each unit in the main hypervisor 100.

The physical device management unit 101 manages physical devices.

The delivery destination determining unit 102 determines the delivery destination of the state and an event of a physical device.

The virtual device management unit 103 manages virtual devices.

The synchronization information transmission unit 104 transmits synchronization information.

The counter control unit 105 controls the performance counter. As the performance counter, the counter 111 in the processor 11 can be used.

The VM execution state retention unit 106 retains the execution state of the virtual computer (VM).

The suspension information acquisition unit 107 performs necessary processing during the suspension of processing by the main virtual computer 150.

The hypervisor service execution unit 108 executes an original hypervisor service.

The restoration information acquisition unit 109 performs necessary processing when processing by the main virtual computer 150 is restored.

FIG. 3 shows a configuration example of the functional blocks of the hypervisor in the clone server computer 2.

Referring to FIG. 3, reference numeral 2 denotes the clone computer; 23, the NIC which is a physical device; 24, the storage (Disk) which is a physical device; 25 and 26, arbitrary physical devices; 200, a clone hypervisor; and 250, a clone virtual computer.

It should be noted that in FIG. 3, reference numeral 252 denotes the other virtual computer which does not take part in the high availability system. The number of the other virtual computer or computers is arbitrary (it should be noted that there may be a case where the other virtual computer does not exist).

Further, in the clone hypervisor 200, reference numeral 201 denotes a physical device management unit; 202, a delivery destination determining unit; 203, a virtual device management unit; 204, a synchronization information reception unit; 205, a counter control unit; 206, a virtual computer execution state retention unit (VM execution state retention unit); 207, a suspended state comparison unit; 208, a hypervisor service execution unit; 209, a restored state setting unit; 210, a breakpoint setting unit; 212, an interrupt information judgment unit; and 213, an I/O buffer retention unit.

Further, in the virtual device management unit 203, reference numerals 233, 237, and 240 respectively denote virtual devices of a NIC, a timer (Timer), and a storage (Disk).

It should be noted that the physical and virtual devices shown in FIG. 3 are merely examples, and the types and numbers of the physical and virtual devices are arbitrary.

The following is an outline of each unit in the clone hypervisor 200.

The physical device management unit 201 manages physical devices.

The delivery destination determining unit 202 determines the delivery destination of the state and event of a physical device.

The virtual device management unit 203 manages virtual devices.

The synchronization information reception unit 204 receives synchronization information.

The interrupt information judgment unit 212 judges whether or not an interrupt occurring during the suspension of processing by the clone virtual computer 250 is an object to be waited.

The I/O buffer retention unit 213 temporarily retains information on an interrupt of a wait or hold.

The counter control unit 205 performs control of the performance counter. As the performance counter, the counter 211 in the processor 21 can be used.

The VM execution state retention unit 206 retains the execution state of the virtual computer (VM).

The suspended state comparing unit 207 performs necessary processing during the suspension of processing by the clone virtual computer 250.

The hypervisor service execution unit 208 executes an original hypervisor service.

The restored state setting unit 209 performs necessary processing at the time of restoration to processing by the clone virtual computer 250.

The breakpoint setting unit 210 sets a breakpoint.

It should be noted that the server computers 1 and 2 each may be configured to have both the arrangement for the main side (FIG. 2) and the arrangement for the clone side (FIG. 3), and the server computers 1 and 2 may interchange the roles of the main and clone systems with each other.

The arrangement and operation of each hypervisor shown in FIGS. 2 and 3 will be mainly described below.

In the main server computer 1, the main hypervisor 100 manages the physical devices (NIC 13, Disk 14, and other physical devices 15 and 16, and the like) connected to the server computer 1. Further, the main hypervisor 100 provides the virtual devices (NIC 133, timer 137, storage 140, and the like) to the virtual computer (main virtual computer 150, and virtual computer 152 that does not take part in the high availability system). As a result of this, the virtual devices are recognized by the main virtual computer 150 as if they are physical devices.

In the clone server computer 2, the clone hypervisor 200 manages the physical devices (NIC 23, Disk 24, and other physical devices 25 and 26, and the like) connected to the server computer 2. Further, the clone hypervisor 200 provides the virtual devices (NIC 233, timer 237, storage 240, and the like) to the virtual computer (main virtual computer 250, and virtual computer 252 that does not take part in the high availability system). As a result of this, the virtual devices are recognized by the clone virtual computer 250 as if they are physical devices.

It should be noted that as one embodiment of the hypervisor, part of the function of the hypervisor may be included in a special virtual computer called a "management domain".

The main hypervisor 100 classifies information associated with the state of a physical device connected to the main server computer 1 into information which can be read by the virtual computer in the main server computer 1 and information which cannot be read by the main virtual computer. The classification is performed by the delivery destination determining unit 102. Further, the delivery destination determining unit 102 reflects (copies) only information which can be read by the main virtual computer in the state of the virtual device corresponding to the virtual computer. For example, when the console of the main server computer 1 is assigned to the main virtual computer 150, information input from the keyboard is reflected in the state of the virtual device corresponding to the main virtual computer 150. On the other hand, when the console is not assigned to the main virtual computer 150, information input from the keyboard is not reflected in the state of the virtual device corresponding to the main virtual computer 150.

In this embodiment, a copy of an input to the main virtual computer 150 operating on the main server computer 1 is transmitted to the clone server computer 2, and the same input as that to the main virtual computer 150 is supplied to the clone virtual computer 250, whereby control is performed to make the main virtual computer 150 and the clone virtual computer 250 exhibit the same behavior. At this time, control is performed in such a manner that the main virtual computer 150 and the clone virtual computer 250 exhibit the same behavior while making the state of the main virtual storage device 140 and the state of the clone virtual storage device 240 coincide with each other.

Here, the fundamental way of thinking in this embodiment will be described below.

Figure 4:
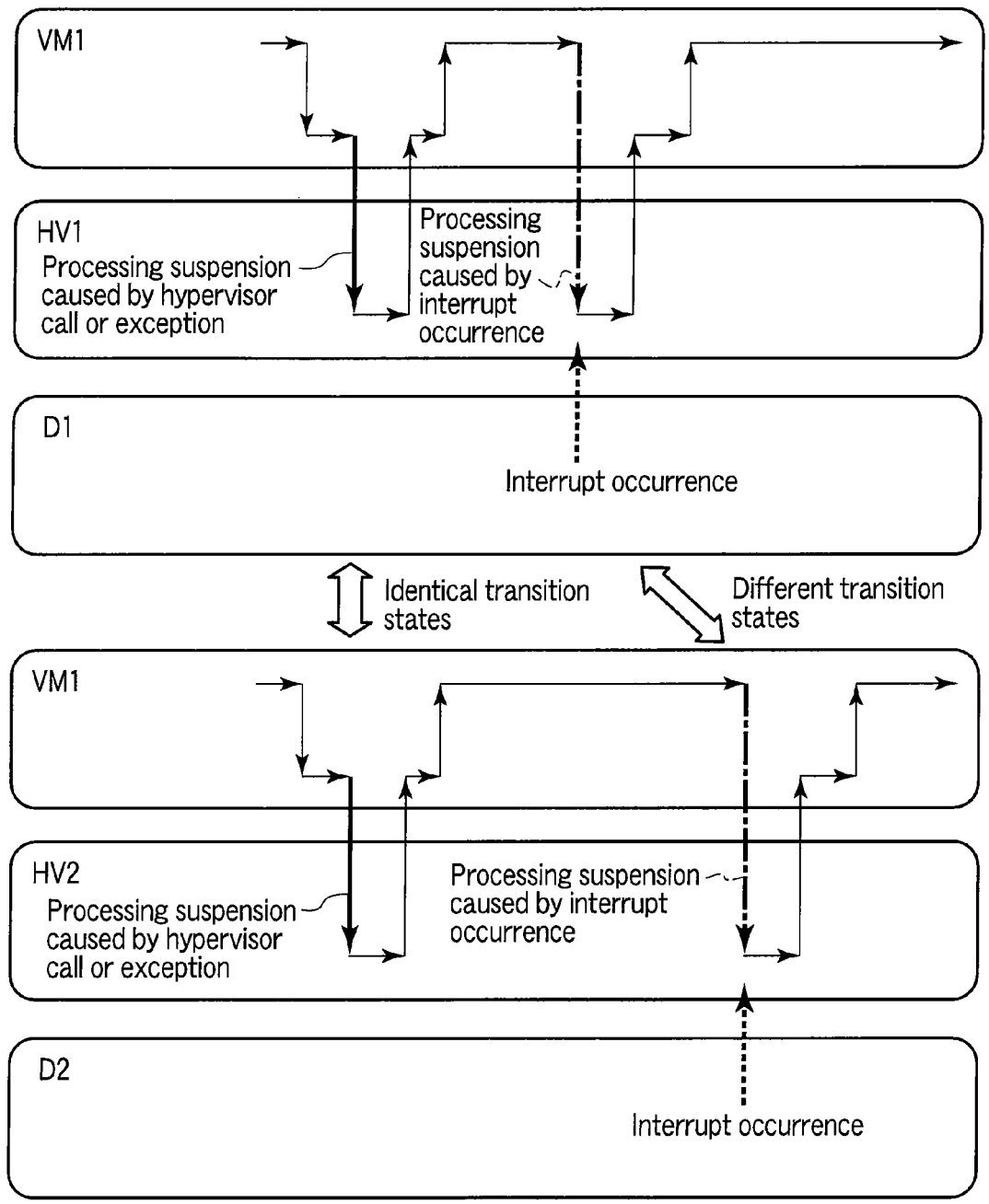
FIG. 4 is a view for explaining control concerning the interrupt timing for processing by a virtual computer.
Figure 6:
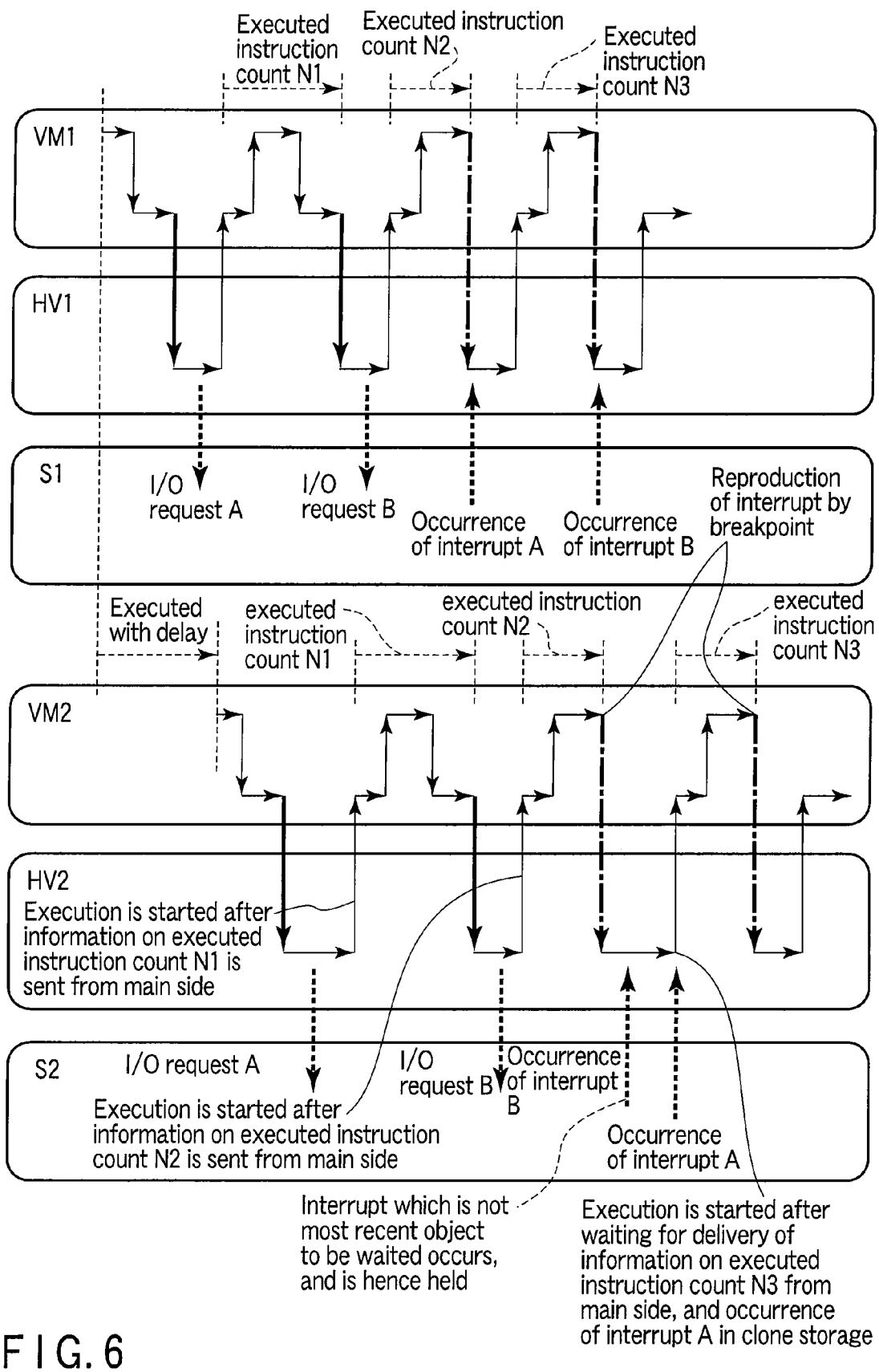
FIG. 6 is a view for explaining control concerning the interrupt timing for processing by a virtual computer.

FIGS. 4 to 6 are views for explaining control associated with interrupt timing for the processing of a virtual computer.

FIG. 4 is a view for explaining a case where an interrupt occurs during execution of the processing by a virtual computer while comparing the case with a case where the hypervisor call or exception has occurred. FIG. 5 is a view for explaining control concerning a wait for an I/O completion interrupt. FIG. 6 is a view for explaining control concerning a hold/wait for an I/O completion interrupt.

It should be noted that in each of FIGS. 4 to 6, an upper half part shows a timing chart associated with the main server computer 1, and the lower half part shows a timing chart associated with the clone server computer 2. Further, in FIG. 4, a reference symbol HV1 denotes the main hypervisor; HV2, the clone hypervisor; VM1, the main virtual computer; and VM2, the clone virtual computer. Further, in FIG. 4, a reference symbol D1 denotes a main device (for example, a main storage); and D2, a clone device (for example, a clone storage). Further, in FIGS. 5 and 6, a reference symbol S1 denotes the main storage; and S2, the clone storage.

(A) Coincidence of Event Occurrence Timings

In general, when an event such as a "hypervisor call", "exception", "interrupt" or the like occurs, and processing by the virtual computer is suspended, a service corresponding to the factor of the suspension is executed, thereafter a virtual computer to be executed next is selected, and the processing is handed over to the virtual computer. It should be noted that in this embodiment, the hypervisor service execution unit 108 or 208 plays the role.

In order to make the main virtual computer 150 and the clone virtual computer 250 exhibit the same behavior, it is necessary to perform control of the clone virtual computer 250 in such a manner that with respect to events occurring in the main virtual computer 150 such as (1) a hypervisor call, (2) occurrence of an exception, and (3) occurrence of an interrupt, and the like, (a) the order of occurrence, and (b) timings of occurrence are identical with those of the main virtual computer 150.

Particularly, as for the timings, if control is not performed in such a manner that the events occur at the same place (program counter) in a sequence of instructions being executed in each of the main virtual computer 150 and clone virtual computer 250, it becomes impossible to make the execution states of both the virtual computers coincide with each other after the occurrence of the events.

Occurrence timings of the events will be described below.

(1) Hypervisor Call

When the initial states of the main virtual computer 150 and clone virtual computer 250 are identical with each other, the occurrence position of the hypervisor call in the program is deterministically determined. Accordingly, the hypervisor call events are brought into the same transition state as shown in FIG. 4.

(2) Exception

When the initial states of the main virtual computer 150 and clone virtual computer 250 are identical with each other, the occurrence position of an exception (access right exception of page, division by zero exception, and the like) occurring during processing by the virtual computer is deterministically determined. Accordingly, the exception events are brought into the same transition state as shown in FIG. 4.

It should be noted that it is conceivable that an exception occurring from a difference in the execution states of the hypervisors does not affect the execution state of the main virtual computer 150 or clone virtual computer 250, and hence the above exception is made outside the object. Specifically, for example, even if a page exception occurs because the memory area (page) to be accessed is not arranged on the actual page by the hypervisor, the fact is concealed when viewed from the virtual computer, and hence it is conceivable that the occurrence of the exception does not affect the execution state of the virtual computer.

(3) Interrupt

Even when the initial state of the main virtual computer 150 is identical with that of the clone virtual computer 250, a timing at which an interrupt occurs is not deterministic with respect to the interrupt for the virtual computer. Accordingly, the interrupt events are brought into transition states different from each other as shown in FIG. 4.

It should be noted that when the interrupt that has occurred is intended for the hypervisor or a virtual computer that does not take part in the high availability system, the interrupt is concealed from the main virtual computer 150 or the clone virtual computer 250, and hence it is conceivable that the interrupt does not affect the execution state of the main virtual computer 150 or clone virtual computer 250, and thus the above interrupt is made outside the object.

As can be seen from the above description, what is needed to be controlled in such a manner that the event occurrence timing is clearly indicated is the interrupt. The fundamental way of thinking for making the interrupt occurrence timings coincide with each other will be described below.

When the main virtual computer 150 and the clone virtual computer 250 are operated simultaneously and in parallel with each other, it is impossible to make the interrupt timings coincide with each other even by any method.

(1) A method in which an interrupt is detected on the main side, and the same interrupt is reproduced on the clone side is considered. In this case, while the interrupt is detected on the main side, information on the detection is sent from the main side to the clone side, and the processing for reproducing the interrupt is performed on the clone side, the timing at which the interrupt should be reproduced on the clone side is missed.

(2) If the interrupt processing for the main virtual computer, and the interrupt processing for the clone virtual computer are performed independently of each other, the delay in above (1) is not caused. However, the timings at which interrupts occur are not deterministic originally, and thus it is not guaranteed that an interrupt occurs on the clone side at the same timing as the timing at which an interrupt occurs on the main side.

As described above, when the main virtual computer 150 and the clone virtual computer 250 are operated simultaneously in parallel with each other, it is impossible to make the interrupt timings coincide with each other.

Thus, in this embodiment, as shown in FIGS. 5 and 6, the main virtual computer 150 is precedently executed, and the clone virtual computer 250 is executed slightly later.

(1) Main Side

In the main virtual computer 150, the number of instructions (number of executed instructions) executed within a period from a reference time point (for example, a time point at which a previous return to the virtual computer is made) to a time point at which an interrupt occurs is measured.

(2) Clone Side

A breakpoint is set in the clone virtual computer 250 at a position of the number of executed instructions measured in above (1).

As a result of this, it is possible to reproduce the timing of an interrupt occurring in the main virtual computer 150 in the clone virtual computer 250. It should be noted that as for the hypervisor call or exception, the occurrence position of the hypervisor call or exception in the program is deterministically determined, and hence the breakpoint described above may not be set without any problem.

(B) Wait Processing and Hold Processing for Storage I/O Completion Interrupt

Here, in order to make the state of the main storage device 14 or 140, and the state of the clone storage device 24 or 240 coincide with each other, it is necessary to cause the clone virtual computer 250 to issue the same I/O request as the I/O request issued by the main virtual computer 150 to the main virtual storage device 140 to the clone virtual storage device 240. It should be noted that if the main virtual computer 150 and the clone virtual computer 250 have exhibited the same behavior before the I/O request is issued, the same I/O request ought to be issued.

Now, when the I/O request is issued to each of the main virtual storage device 140 and the clone virtual storage device 240, an I/O completion interrupt occurs in each of the main virtual storage device 140 and the clone virtual storage device 240. The timing at which the interrupt occurs is nondeterministic. Accordingly, in order to input I/O completion interrupt information to the clone side at the same timing as the timing at which the interrupt occurs on the main side, it is necessary to wait until both the conditions;

(1) "reception of information on the fact that an I/O completion interrupt has occurred in the main virtual storage device 140 from the main side", and (2) "occurrence of an I/O completion interrupt in the clone virtual storage device 240" are achieved. Otherwise, it is not possible to achieve the condition for causing the timing at which the interrupt is given to the clone side to coincide with the timing at which the interrupt occurs on the main side.

Further, even when two successive I/O requests are issued to the storage, I/O completion interrupts do not always occur in the order of issuance of the I/O requests. For example, even when I/O requests are issued in the order of request A/request B, there is the possibility of I/O completion interrupts occurring in the order of response B/response A. Thus, at the time of waiting for occurrence of an I/O completion interrupt in the clone virtual storage device 240 of above (2), when an I/O completion interrupt which has not been the most recent object to be waited has occurred, it is necessary to hold the interrupt until the wait which will occur later.

It should be noted that a method (first method) in which processing (for example, the processing of the part of the number N1 of the executed instructions) up to the suspension by the I/O completion interrupt is made to wait for catching of an I/O completion interrupt from the clone virtual storage device 240, and a method (second method) in which an interrupt handler call (corresponding to a storage I/O completion interrupt) is made to wait are possible.

Specifically, for example, as for the storage I/O completion interrupt, it is possible to make storage I/O completion interrupt inputs coincide with each other by operating the main hypervisor 100 and clone hypervisor 200 in the following manner.

(1) Main Hypervisor 100

The main hypervisor 100 checks the interrupt occurrence timing of the main virtual computer 150, and transmits the information to the clone hypervisor 200.

(2) Clone Hypervisor 200

(a) The clone hypervisor 200 waits for the information of above (1), and I/O completion interrupt occurrence in the clone storage 24 corresponding to the information (the most recent object to be waited).

(b) When an I/O completion interrupt which is not corresponding to the information of (1) (the most recent object to be waited) occurs in the clone storage device 24, the interrupt is held until a next wait which will occur later.

(c) When the wait is completed, a breakpoint is set in the clone hypervisor 200 in accordance with the information of (1) in such a manner that an interrupt occurs at the same timing with respect to the clone virtual computer 250, and execution control is transferred to the clone virtual computer 250.

It should be noted that when only an interrupt handler call corresponding to the storage I/O completion interrupt is made to wait, the processing (for example, the processing of the part of the number N1 of the executed instructions of FIG. 5) up to the suspension by the storage I/O completion interrupt is not made to wait, and is made to occur at the same timing by using the breakpoint. Further, a subsequent interrupt handler call is made to wait for I/O completion interrupt occurrence.

By combining the control of above (A) and control of (B) with each other, it is possible to perform control to make the main virtual computer 150 and clone virtual computer 250 exhibit the same behavior while making the state of the main virtual storage device 140 and the state of the clone virtual storage device 240 coincide with each other.

FIG. 5 exemplifies a case where an I/O request occurs in the main virtual computer 150, an I/O completion interrupt occurs in the main virtual storage device 140, an I/O request occurs in the clone virtual computer 250, and an I/O completion interrupt occurs in the clone virtual storage device 240. In this case, first, in the main hypervisor 100, the number N1 of executed instructions is measured with respect to the interrupt, the number N1 of executed instructions is transmitted from the main hypervisor 100 to the clone hypervisor 200, and the clone hypervisor 200 reproduces the interrupt by the breakpoint. In the main hypervisor 100, the number N2 of executed instructions is measured with respect to the interrupt, and the number N2 of executed instructions is transmitted from the main hypervisor 100 to the clone hypervisor 200. The clone hypervisor 200 receives the number N2 of executed instructions, waits for occurrence of an interrupt in the clone virtual storage device 240, and then starts the next execution. It should be noted that in FIG. 5, the method (second method) in which after execution of instructions of the number N1, interrupt occurrence in the clone virtual storage device 240 is waited, the processing is then returned to the virtual computer, and then instructions of the number N2 are executed has been employed. In place of the second method, the method (first meth) in which instructions of the number N1 are not executed, interrupt occurrence in the clone virtual storage device 240 is waited, the control is returned to the virtual computer, and then instructions of the number N1 are executed may be employed.

FIG. 6 exemplifies a case where in the main virtual computer 150, I/O requests occur in the order of I/O request A/I/O request B, I/O completion interrupts from the main virtual storage device 140 occur in the order of interrupt A/interrupt B, on the other hand, in the clone virtual computer 250, I/O requests occur in the same order as the main virtual computer 150, i.e., in the order of I/O request A/I/O request B, and I/O completion interrupts from the main virtual storage device 140 occur in the order opposite to the main virtual computer 150, i.e., in the order of interrupt B/interrupt A. In this case, the clone hypervisor 200 temporarily holds the previously occurred interrupt B, and treats the interrupt B as if it occurs after the interrupt A occurs. It should be noted that in FIG. 6, the method (second method) in which after execution of instructions of the number N2, interrupt A occurrence in the clone virtual storage device 240 is waited, the processing is then returned to the virtual computer, and then instructions of the number N3 are executed has been employed. In place of the second method, the method (first meth) in which instructions of the number N2 are not executed, interrupt A occurrence in the clone virtual storage device 240 is waited, the control is returned to the virtual computer, and then instructions of the number N2 are executed may be employed.

An outline of the processing will be summarized on the basis of the fundamental way of thinking described previously.

Making the main virtual computer 150 and clone virtual computer 250 exhibit the same behavior can be realized by executing the clone virtual computer 250 slightly later than the execution of the main virtual computer 150, transmitting a copy of information input to the main virtual computer 150 operating on the main server computer 1 to the clone server computer 2, and supplying the same input information as the input information to the main virtual computer 150 to the clone virtual computer 250 at the same timing as the timing at which the information is input to the main virtual computer 150.

Furthermore, in order to make the state of the main virtual storage device 140 and the state of the clone virtual storage device 240 coincide with each other, control is performed to make the clone virtual computer 250 issue the same I/O request as that issued by the main virtual computer 150 to the main virtual storage device 140 to the clone virtual storage device 240. It should be noted that if the main virtual computer 150 and the clone virtual computer 250 have exhibited the same behavior before the I/O request is issued, the same I/O request ought to be issued.

Here, when an I/O request is issued to each of the main virtual storage device 140 and clone virtual storage device 240, an I/O completion interrupt occurs in each of the main virtual storage device 140 and clone virtual storage device 240. However, the interrupt timings do not always coincide with each other on both the main side and the clone side. Further, the I/O completion interrupts do not always occur in the same order as the order in which the I/O requests have been issued.

Thus, as for the storage I/O completion interrupts, it is possible to make the storage I/O completion interrupt inputs coincide with each other by operating the clone hypervisor 200 in the following manner.

(a) The clone hypervisor 200 waits for the synchronization information transmitted from the main side and occurrence of an I/O completion interrupt from the clone storage corresponding to the synchronization information (the most recent (imminent) object to be waited).

(b) When an I/O completion interrupt which is not corresponding to the synchronization information transmitted from the main side (the most recent object to be waited) occurs in the clone storage, the interrupt is held until a next wait which will occur later.

(c) When the wait is completed, a breakpoint is set in the clone hypervisor 200 in accordance with the synchronization information transmitted from the main side in such a manner that an interrupt occurs at the same timing with respect to the clone virtual computer 250, and execution control is transferred to the clone virtual computer 250.

It should be noted that a method in which only the return of the control (interrupt handler call) to the virtual computer from the I/O completion interrupt is waited may be employed.

Details of the processing described above will be described below centering on the processing of the functional blocks shown in FIGS. 2 and 3.

In this embodiment, in the main server computer 1 of FIG. 1, the main virtual computer 150 is executed in advance. When the control is transferred from the main virtual computer 150 to the main hypervisor 100, the execution state of the main virtual computer 150 is retained in the VM execution state retention unit 106, thereafter the factor of the suspension of the processing by the virtual computer is examined by the suspension information acquisition unit 107, and synchronization information (contents of the information will be described later) corresponding to the factor of the suspension is acquired. When the factor of the suspension is an interrupt, the interrupt occurrence timing (specifically, the number of executed instructions from a reference point in time (for example, the last point in time at which the control has been returned to the virtual computer)) in the main virtual computer 150 is examined, and the examination result is added to the synchronization information. The synchronization information transmission unit 104 transmits the acquired synchronization information to the clone hypervisor 200. It should be noted that when the factor of the suspension cannot be identified until the service execution by the hypervisor service execution unit to be described later, or the return of control to the main virtual computer 150, the factor of the suspension may be identified until immediately before transmission of synchronization information associated with the return of control, and then the synchronization information may be transmitted.

Subsequently, the hypervisor service execution unit 108 executes a service corresponding to the factor of the suspension of the execution of the main virtual computer 150, selects the virtual computer to be executed next, and transfers the processing thereto. Here, when the main virtual computer 150 is selected as the virtual computer to be executed next, the restoration information acquisition unit 109 examines the state at the time of returning the control to the main virtual computer 150, and acquires synchronization information (contents of the information will be described later) corresponding to the state at the time of returning the control to the main virtual computer 150. The synchronization information transmission unit 104 transmits the acquired synchronization information to the clone hypervisor 200. When the factor of the return is interrupt processing, the delivery destination determining unit 102 makes the state of a virtual device of the main virtual computer 150 reflect the input information, and the synchronization information transmission unit 104 transmits the input information to the clone hypervisor 200.

In general, a virtual computer includes a plurality of virtual devices. Accordingly, in the input information, identification information for identifying a virtual device to be reflected, and information to be reflected in the virtual device are contained. Further, in the case of an input corresponding to a request, such as read data input corresponding to a storage read request, information for judging to which request the input corresponds is contained in the input information.

In the clone server computer 2 of FIG. 3, the restored state setting unit 209 performs preparation for the restored state of the clone virtual computer 250 on the basis of information on the restored state of the main virtual computer 150 of the last time received by the synchronization information reception unit 204 (detailed processing contents will be described later). Further, when the factor of the next suspension is an interrupt, the breakpoint setting unit 210 sets a breakpoint in such a manner that an interrupt occurs at the same timing as the main virtual computer 150, and transfer the control to the clone virtual computer 250. This makes the state transition of the clone virtual computer 250 identical with that of the main virtual computer 150. It should be noted that when the factor of the suspension is a hypervisor call or exception, the state transitions of the clone virtual computer 250 and that of the main virtual computer 150 become identical with each other without setting a breakpoint.

It should be noted that in this embodiment, in each of the main virtual computer 150 and clone virtual computer 250, control of a counter for synchronizing the interrupt timings with each other is performed in each of the counter control unit 105 and the counter control unit 205. Further, in accordance with the value of the counter, the breakpoint is set by the breakpoint setting unit 210.

When the control is transferred to the clone virtual computer 250, and the processing by the clone virtual computer 250 is suspended in a short time, the suspended state comparison unit 207 determines whether or not the processing of the clone virtual computer 250 is suspended because of the designated factor and at a designated position. Here, when the factor of the suspension is a hypervisor call, and an I/O request to the virtual storage device, the hypervisor service execution unit 208 causes the clone virtual computer 250 to issue the same I/O request as that issued by the main virtual computer 150 to the main virtual storage device 140 to the clone virtual storage device 240 in order to make the state of the main virtual storage device 140 and the state of the clone virtual storage device 240 coincide with each other. It should be noted that if the main virtual computer 150 and the clone virtual computer 250 have exhibited the same behavior before the I/O request is issued, the same I/O request ought to be issued.

Here, when an I/O request is issued to the clone virtual storage device 240, an I/O completion interrupt occurs in the clone virtual storage device 240. However, unless the timing at which an input (interrupt, in this case) is given to the clone side is the timing designated by the synchronization information sent from the main side, the main virtual computer 150 and the clone virtual computer 250 do not exhibit the same behavior, and hence it is necessary to wait for the coincidence of the synchronization (interrupt) information from the main side and the synchronization (interrupt) information from the clone side corresponding to the synchronization information (most recent object to be waited) from the main side. Further, when an I/O completion interrupt which is not corresponding to the synchronization information (the most recent object to be waited) sent from the main side occurs in the clone virtual storage device 24*o*, it is necessary to hold the interrupt until a wait which will occur later.

For this reason, when the interrupt is an I/O completion interrupt from the clone virtual storage device 240, the interrupt information judgment unit 212 hands over the interrupt information to the synchronization information reception unit 204. As a result of this, at the time of the preparation for the restored state of the clone virtual computer 250 in the restored state setting unit 209, when the factor for the restoration is an I/O completion interrupt from the virtual storage device, it is possible to realize a wait for the coincidence of the synchronization information from the main side and the synchronization information from the clone side, and a hold lasting thereto.

Further, in order to perform control to make the main virtual computer 150 and the clone virtual computer 250 exhibit the same behavior, causing the state of the clone virtual device to reflect the input information must be performed by the restored state setting unit 209 after the coincidence of the interrupt synchronization information from the main side and the interrupt synchronization information from the clone side, and hence the input information must be prevented from being overwritten by the I/O completion interrupt from the clone virtual device. Thus, as for the I/O request to the clone virtual storage device 240, a memory area to which an I/O request is to be made is duplicated in the I/O buffer retention unit 213, and the I/O request is made to the duplicated memory area.

It should be noted that the actual data transmission route of the above-mentioned synchronization information and input information is passed through the NIC 13 included in the server computer 1 in FIG. 1, the network connecting the server computers 1 and 2 to each other, and the NIC 23 included in the server computer 2. Further, for exchanges of the synchronization information and input information, in each of the synchronization information transmission unit 104 and synchronization information reception unit 204, information (for example, a network address of a computers of communication partner such as an IP address and port number) for identifying the communication partner is managed. Further, for example, when the hypervisor manages a plurality of virtual computers, information (ID) for determining which of the virtual computers is the correspondent one is also included in the information for identifying the communication partner. It should be noted that the information for identifying the communication partner may be manually set before the start-up of the virtual computer, or may be automatically set by another module.

Now, details of information exchanged between the synchronization information transmission unit 104 and synchronization information reception unit 204 will be described below. The synchronization information transmission unit 104 transmits, each time each of the following events occurs, the information on the event to the synchronization information reception unit 204.

(A) a hypervisor call issued by the main virtual computer 150

(B) a response of the main hypervisor 100 corresponding to above (A)

(C) catching of an exception (D) an exception handler call in the main virtual computer 150 corresponding to above (C)

(E) catching of an interrupt (F) an interrupt handler call in the main virtual computer 150 corresponding to above (E)

Of these items, (A), (C), and (E) are factors of suspension, and (B), (D), and (F) are factors of restoration.

First, the disposal of the respective events performed by the main hypervisor 100 in the main server computer 1 will be described below.

(A) Although the hypervisor call is a factor of the execution suspension of the main virtual computer 150, and the hypervisor call is an event deterministically caused by the main virtual computer 150, and hence information on the event occurrence timing is not necessary, and it is advisable to transmit only information on the occurrence of the event to the clone hypervisor 200. Further, the hypervisor call is an output issued by the virtual computer to the outside, and hence it is sufficient if the "type of the hypervisor call" and "information on the argument" are included in the synchronization information to be transmitted. Furthermore, "contents of the saved register" and the like may also be transmitted. It should be noted that when the hypervisor manages a plurality of virtual computers other than the main virtual computer 150, only the hypervisor call caused by the main virtual computer 150 is the object, and a hypervisor call caused by the other virtual computer is not the object.

(B) In the case of a response of the main hypervisor 100 to the hypervisor call, the contents of the response become the input to the main virtual computer 150, and hence it is sufficient if the contents of the response are transmitted to the clone hypervisor 200. It is sufficient if "response information on the hypervisor call" and "information on the response route" are included in the synchronization information to be transmitted. In the contents of the response, various types of information (for example, a register of a processor, stack, memory space jointly owned by the hypervisor and the virtual computer, event identifier in a mechanism for transmitting an event between the hypervisor and virtual computer, and the like) are included depending on the design of an interface between the hypervisor and virtual computer.

(C) Although occurrence of an exception is a factor of the suspension of the execution of the main virtual computer 150, and the exception is an event deterministically caused by the main virtual computer 150, and hence information on the event occurrence timing is not necessary, and it is advisable to transmit only information on the occurrence of the event to the clone hypervisor 200. Further, the exception is an output issued by the virtual computer to the outside, and hence it is sufficient if the "contents of the exception" are included in the synchronization information to be transmitted. It should be noted that even an exception occurring during execution of the main virtual computer 150, if the exception is due to being virtualized by the hypervisor, and is concealed from the execution of the main virtual computer 150, is not the object. For example, a page exception caused by memory access to a memory area in which memory allocation is cancelled by the hypervisor corresponds to the above exception. The timing at which such an exception occurs, and whether or not such an exception occurs are determined by the execution state of the hypervisor, and hence it is not guaranteed that such an exception occurs on the clone side. Accordingly, such an exception is not the object. Further, when the hypervisor manages a plurality of virtual computers other than the main virtual computer 150, only the exception caused by the main virtual computer 150 is the object, and an exception caused by the other virtual computer is not the object.

(D) In the case of an exception handler call of the main virtual computer 150 corresponding to the exception, there are a case where it is not necessary for the hypervisor to dispose of the exception, and a case where it is necessary for the hypervisor to dispose of the exception in a particular way. In the case where special disposal is not necessary, it is sufficient if the exception handler call is transmitted to the clone hypervisor 200. It is sufficient if "information indicative of execution of the exception handler call" is included in the synchronization information to be transmitted. On the other hand, in the case where special disposal is necessary, it is sufficient if the contents of the disposal are transmitted to the clone hypervisor 200.

(E) Although occurrence of an interrupt is a factor of the suspension of the execution of the main virtual computer 150, the interrupt is a nondeterministic event. Further, in the interrupt occurring in the main server computer 1, there are a case where the bearer of the processing corresponding to the interrupt is the main hypervisor 100 itself, a case where the bearer is the main virtual computer 150, and a case where the bearer is a virtual computer other than the main virtual computer 150. Of these cases, the interrupts other than the "interrupt to be disposed of by the main virtual computer 150" are concealed from the execution of the main virtual computer 150, and hence these interrupts need not be transmitted to the clone hypervisor 200. The main hypervisor 100 has only to transmit only information on the "interrupt (event requiring a call of the interrupt handler of the main virtual computer 150) to be disposed of by the main virtual computer 150" to the clone hypervisor 200. As the interrupt to be disposed of by the main virtual computer 150, there is, in addition to the interrupt caused by the hardware of the I/O equipment, for example, a software interrupt caused by the hypervisor or the other virtual computer to transmit the event to the main virtual computer 150. For example, an inter-domain interrupt in Xen or the like corresponds to this.

Furthermore, on the clone virtual computer 250 side, in order to realize suspension of processing by an interrupt, and an interrupt handler call in the same process, the main hypervisor 100 acquires the value of the program counter, and information on the number of executed instructions provided by the performance counter as information on the interrupt position (i.e., information for identifying the position of occurrence of the interrupt of the main virtual computer 150), and transmits the acquired information to the clone hypervisor 200.

As described above, it is sufficient if "identification information (ID) of the main virtual computer 150 by which the interrupt handler is activated", "interrupt information (vector number)", and "information on the interrupt position" are included in the synchronization information to be transmitted.

(F) As for the interrupt handler call to be disposed of by the main virtual computer 150 caught in above (E), the contents of the handler call become the input to the main virtual computer 150, and hence it is only necessary to transmit information on the handler call (data contents and a vector number associated with the interrupt disposal, and in the case of an input corresponding to a request such as a read data input for a storage read request or the like, information for determining the request to which the input corresponds or the like) to the clone hypervisor 200.

Next, disposal of the respective events by the clone hypervisor 200 of the clone computer 2 to which the above-mentioned information is transmitted will be described below.

The clone hypervisor 200 stores the synchronization information transmitted thereto from the main hypervisor 100 in a queue, and disposes of the information in sequence from the synchronization information at the head of the queue. Disposal of the synchronization information stored in the queue will be described below.

(A) When the synchronization information is a hypervisor call, this is an event that deterministically occurs in the clone virtual computer 250. Accordingly, it is only necessary to transfer the control to the clone virtual computer 250, wait for the issuance of the hypervisor call and, when the hypervisor call is issued, confirm whether or not the hypervisor call is identical with that recorded in the synchronization information. When the confirmation is acquired, the synchronization information is deleted from the queue.

It should be noted that the response to this hypervisor call is input to the clone virtual computer 250 as the contents of "(B) the response to the hypervisor call", and hence the individual response in the clone hypervisor 200 is not performed. However, when the hypervisor call is an I/O request to the virtual storage device, an I/O is issued to the clone virtual storage device 240 in order to make the state of the clone virtual storage device 240 coincide with that of the main virtual storage device 140. At this time, the I/O request to the clone virtual storage device 240 is performed in the following manner. That is, a memory area to which an I/O request is to be made is duplicated in the I/O buffer retention unit 213, and the I/O request is made to the duplicated memory area. Further, the I/O may be issued either at a point in time after it is confirmed whether or not the issued hypervisor call is identical with that recorded in the synchronization information, or at a point in time of below (B).

(B) When the synchronization information is a response of the main hypervisor 100 to the hypervisor call, preparation for returning the response contents of the main hypervisor 100 to the clone virtual computer 250 as they are is performed. Specifically, the response contents are stored in the response route included in the synchronization information. When the hypervisor call is an I/O request to the virtual storage device, it is confirmed that the response contents of the I/O issued in above (A) and the response contents included in the synchronization information coincide with each other, and the response contents are stored. At this time, the response contents to be stored may be either the response contents of the I/O issued in above (A) or the response contents included in the synchronization information. Further, the I/O may be issued at the point in time of above (A) or at the point in time of the preparation for returning the response contents to the clone virtual computer 250.

It should be noted that it is not possible to determine the factor of the suspension of the execution of the next main virtual computer 150 by only "(B) the response to the hypervisor call" of the synchronization information, and hence here, the control is not immediately transferred to the clone virtual computer 250, and after only deleting the synchronization information from the queue, the control is advanced to the disposal of the next synchronization information.

(C) When the synchronization information is the catching of an exception, this is an event that deterministically occurs also in the clone virtual computer 250. Accordingly, it is sufficient if the control is transferred to the clone virtual computer 250, occurrence of the exception is waited, and when the exception occurs, it is confirmed that the exception is the same as that recorded in the synchronization information. When the confirmation is obtained, the synchronization information is deleted from the queue.

It should be noted that the exception handler call corresponding to the exception is input to the clone virtual computer 250 as the contents of "(D) the exception handler call corresponding to the exception", and hence the individual response in the clone hypervisor 200 is not performed.

(D) When the synchronization information is an exception handler call, preparation for the exception handler call is performed. Specifically, when it is not necessary for the hypervisor to subject the exception to special disposal, preparation is performed in accordance with the "information indicative of execution of the exception handler call" included in the synchronization information so that the exception handler can be called when the control is transferred to the clone virtual computer 250 next time. When it is necessary for the hypervisor to subject the exception to special disposal, the disposal is performed by the clone hypervisor 200 in accordance with the disposal contents included in the synchronization information, thereby preparing for the time when the control is transferred to clone virtual computer 250 next time.

It should be noted that it is not possible to determine the factor of the suspension of the execution of the next main virtual computer 150 by only "(D) the exception handler call corresponding to the exception" of the synchronization information, and hence here, the control is not immediately transferred to the clone virtual computer 250, and after only deleting the synchronization information from the queue, the control is advanced to the disposal of the next synchronization information.

(E) When the synchronization information is occurrence of an interrupt, a place at which a pseudo-interrupt is to be caused is determined by referring to the interrupt position information included in the synchronization information. Then, after performing the disposal such as setting the number of instructions up to the pseudo-interrupt point by using the breakpoint function of the processor, and the performance counter function for causing an interrupt after execution of a certain number of instructions or the like, the control is transferred to the clone virtual computer 250, and then occurrence of an exception which will occur at the pseudo-interrupt position or the like is waited. When the type of the interrupt is an I/O completion interrupt from the virtual storage device, the processing of determining the place at which the pseudo-interrupt is caused is waited until the two information items, i.e., "(E) interrupt occurrence" of the synchronization information and "the I/O completion interrupt from the clone virtual storage device" coincide with each other.

(F) When the synchronization information is an interrupt handler call, preparation for the interrupt handler call is performed. Specifically, preparation is performed in accordance with the "information on the interrupt handler call" included in the synchronization information so that the interrupt handler can be called when the control is transferred to the clone virtual computer 250 next time. When the type of the interrupt is an I/O completion interrupt from the virtual storage device, the clone virtual storage device 240 is made to reflect the contents of the data of the I/O buffer as information necessary for the preparation for the interrupt handler call.

It should be noted that it is not possible to determine the factor of the suspension of the execution of the next main virtual computer 150 by only "(D) the interrupt handler call" of the synchronization information, and hence here, the control is not immediately transferred to the clone virtual computer 250, and after only deleting the synchronization information from the queue, the control is advanced to the disposal of the next synchronization information.

The series of the above processing items are performed by the cooperation of the main hypervisor 100 and clone hypervisor 200, whereby it is possible to make the inputs to the main virtual computer 150 and clone virtual computer 250 completely coincide with each other while making the contents of the main virtual storage device 140 and those of the clone virtual storage device 240 coincide each other, and realize the synchronization of the execution states.

It should be noted that in this embodiment, although the synchronization information transmission unit 104, and synchronization information reception unit 204 are in the hypervisor, it is possible to employ a configuration in which a special virtual computer (management domain) different from the main virtual computer 150, clone virtual computer 250, and the virtual computer that does not take part in the high availability system is arranged on each of the main server computer 1 and clone server computer 2 in order to utilize the functions possessed by the virtual computer side such as communication protocol processing and the like necessary for the network communication, and part of the functions of the synchronization information transmission unit 104 and synchronization information reception unit 204 is imparted to the special virtual computer.

Next, the operation procedure of the main hypervisor 100 which is the hypervisor in the main server computer 1 will be described below.

Figure 7:
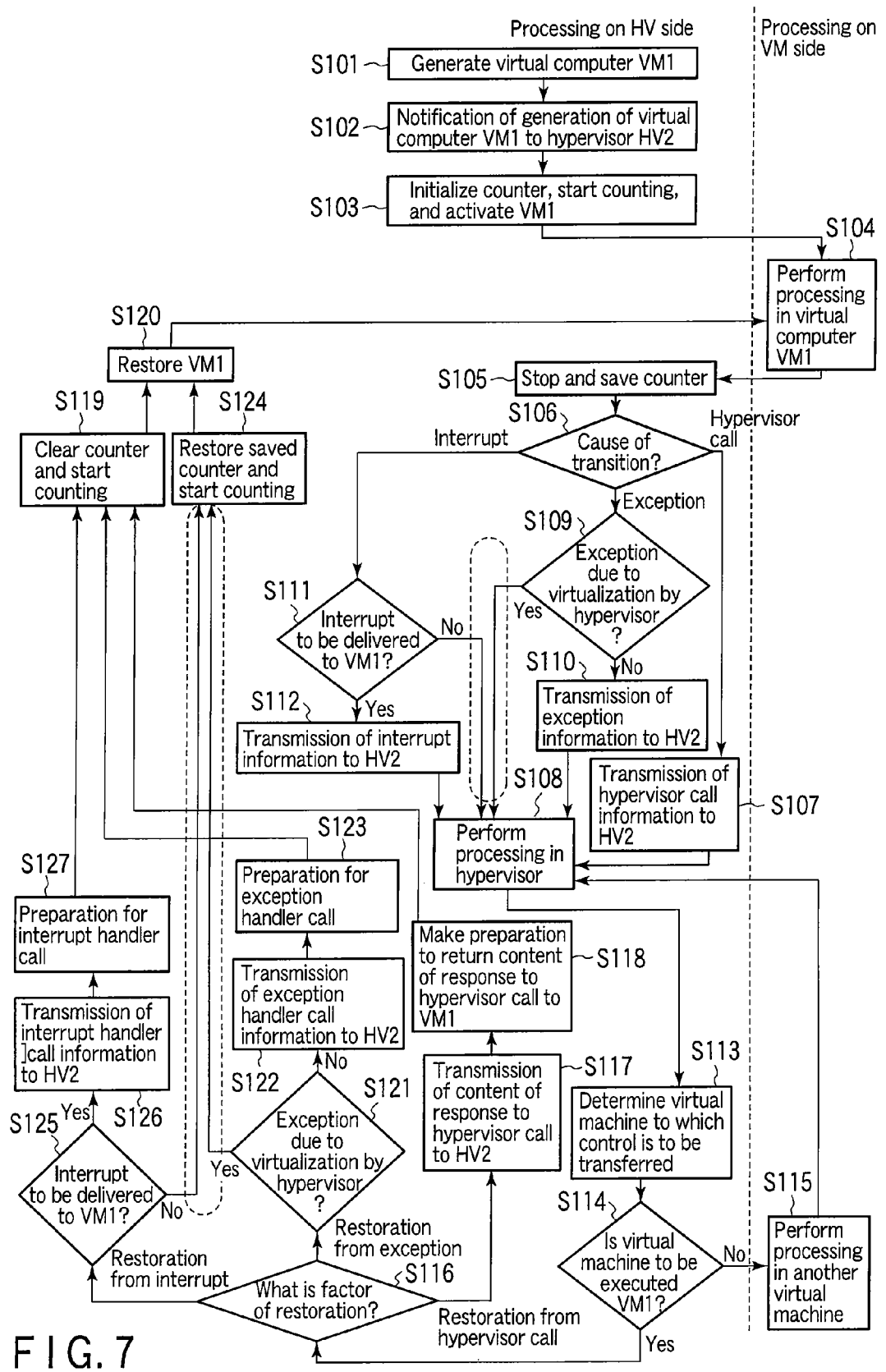
FIG. 7 is a flowchart showing an example of an operation procedure of a hypervisor in the server computer on the main side.

FIG. 7 shows an example of the operation procedure of the main hypervisor 100.

It should be noted that in FIG. 7, a reference symbol HV2 denotes the clone hypervisor 200; VM1, the main virtual computer 150; and VM2, the clone virtual computer 250.

It should be noted that in FIG. 7, the parts encircled by dotted lines are parts corresponding to an interrupt or exception unconcerned with the VM1.

In the main hypervisor 100, upon receipt of a main virtual computer 150 generation request from the management program or the like, the hypervisor service execution unit 108 generates the main virtual computer 150 (step S101). Generation of the main virtual computer 150 is notified to the clone hypervisor 200 (step S102).

The counter control unit 105 initializes the performance counter (hereinafter referred to as a counter), starts to count the number of executed instructions, and starts the main virtual computer 150 (step S103). Here, the flow is temporarily shifted to the processing in the main virtual computer 150 (step S104). Further, during the processing in the main virtual computer 150, when a hypervisor call, exception, or interrupt occurs, the processing is returned to the main hypervisor 100.

When a hypervisor call, exception, or interrupt occurs, and the processing is returned to the main hypervisor 100, the counter control unit 105 stops the counter, and saves the value thereof (step S105).

Subsequently, the suspension information acquisition unit 107 examines the factor of the suspension of the processing of the main virtual computer 150 (step S106).

When the transition factor (suspension factor) is a hypervisor call, the synchronization information transmission unit 104 transmits the synchronization information associated with the call to the synchronization information reception unit 204 of the clone hypervisor 200 (step S107). Further, the hypervisor service execution unit 108 executes the processing in the hypervisor corresponding to the hypervisor call (step S108).

When the transition factor is an exception, the suspension information acquisition unit 107 determines whether or not the exception is due to being virtualized by the hypervisor, and is concealed from the execution of the main virtual computer 150 (step S109). As an example of an exception concealed from the execution of the main virtual computer 150, for example, a page exception caused by memory access to a memory area in which memory allocation is cancelled by the hypervisor corresponds to the above exception. When the exception is associated with the main virtual machine, as in the case of the hypervisor call, the synchronization information associated with the exception is transmitted to the synchronization information reception unit 204 of the clone hypervisor 200 (step S110), and the hypervisor service execution unit 108 executes the processing in the hypervisor corresponding to the exception (step S108). When the exception is concealed from the execution of the main virtual computer 150, the synchronization information is not transmitted, and the hypervisor service execution unit 108 executes the processing of the exception (step S108).

When the transition factor is an interrupt, as in the case of the exception, the suspension information acquisition unit 107 determines whether or not the interrupt is an interrupt to be delivered to the main virtual computer 150 (step S111). When the interrupt is an interrupt to be delivered to the main virtual computer 150, the synchronization information associated with the interrupt is transmitted to the synchronization information reception unit 204 of the clone hypervisor 200 (step S112), and the hypervisor service execution unit 108 executes the processing in the hypervisor corresponding to the interrupt (step S108). When the interrupt is an interrupt not to be delivered to the main virtual computer 150, the synchronization information is not transmitted, and the hypervisor service execution unit 108 executes the processing of the interrupt (step S108).

Subsequently to step S108, the hypervisor service execution unit 108 determines a virtual computer to which the control is to be transferred next (step S113). It is determined whether or not the virtual computer to be started is the main virtual computer 150 (step S114), and when the virtual computer to be started is another virtual computer, once the processing of another virtual computer is performed (step S115), and then the flow is returned to the processing of step S108 in the hypervisor. When the virtual computer to be started is the main virtual computer 150 in step S114, the processing after step S116 is performed.

When, in step S114, the virtual computer to be started is the main virtual computer 150, in the main hypervisor 100, the restoration information acquisition unit 109 examines the state at the time at which the main virtual computer 150 is to be restored (step S116).

When the state at the time of the restoration is the restoration from the hypervisor call, the synchronization information transmission unit 104 transmits the contents of the response to the hypervisor call to the synchronization information reception unit 204 of the clone hypervisor 200 (step S117), performs preparation for returning the contents of the response to the hypervisor call to the main virtual computer 150 (step S118), clears the counter to start counting (step S119), and the hypervisor service execution unit 108 restores the main virtual computer 150 (step S120). After this, the processing from step S104 is repeated.

When the state at the time of the restoration is an exception, the restoration information acquisition unit 109 determines whether or not the exception is due to being virtualized by the hypervisor, and is concealed from the execution of the main virtual computer 150 (step S121). When the exception is associated with the main virtual machine, as in the case of the restoration from the hypervisor call, the synchronization information associated with the exception handler call is transmitted to the synchronization information reception unit 204 of the clone hypervisor 200 (step S122), preparation for the exception handler call of the main virtual computer 150 is performed (step S123), the counter is cleared to start counting (step S119), and the hypervisor service execution unit 108 restores the main virtual computer 150 (step S120). After this, the processing from step S104 is repeated. When the exception is concealed from the execution of the main virtual computer 150, the synchronization information is not transmitted, the counter saved by the counter control unit 105 is restored to start counting (step S124), and the hypervisor service execution unit 108 restores the main virtual computer 150 (step S120). After this, the processing from step S104 is repeated.

When the state at the time of the restoration is an interrupt, as in the case of the exception, the restoration information acquisition unit 109 determines whether or not the interrupt is an interrupt to be delivered to the main virtual computer 150 (step S125). When the interrupt is an interrupt to be delivered to the main virtual computer 150, the synchronization information associated with the interrupt handler call is transmitted to the synchronization information reception unit 204 of the clone hypervisor 200 (step S126), preparation for the interrupt handler call of the main virtual computer 150 is performed (step S127), the counter is cleared to start counting (step S119), and the hypervisor service execution unit 108 restores the main virtual computer 150 (step S120). After this, the processing from step S104 is repeated. When the interrupt is an interrupt not to be delivered to the main virtual computer 150, the synchronization information is not transmitted, the counter saved by the counter control unit 105 is restored to start counting (step S124), and the hypervisor service execution unit 108 restores the main virtual computer 150 (step S120). After this, the processing from step S104 is repeated.

Next, the operation procedure of the clone hypervisor 200 which is the hypervisor in the clone server computer 2 will be described below.

Figure 8A:
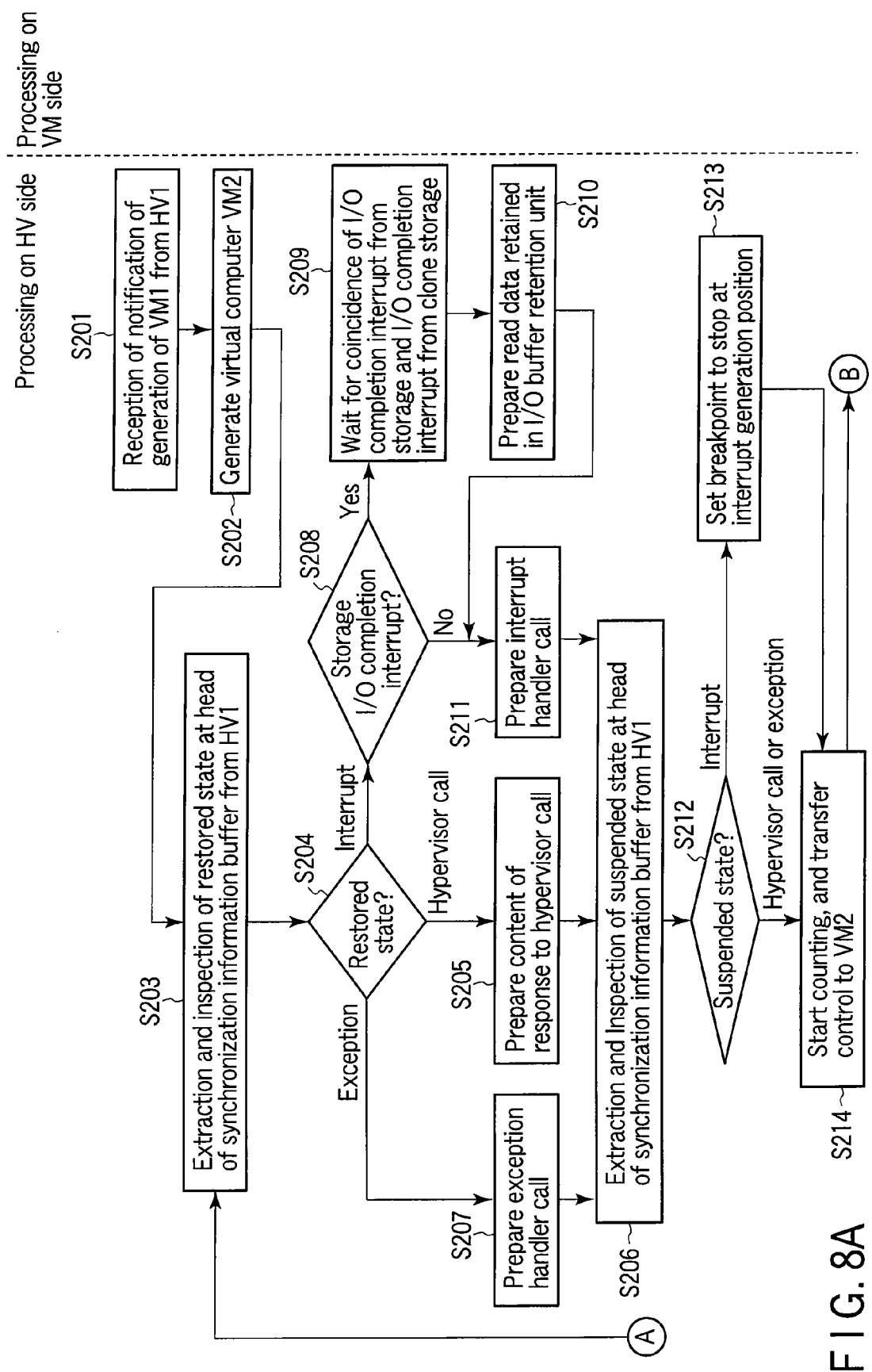
FIG. 8A is a flowchart showing an example of an operation procedure of a hypervisor in the server computer on the clone side.
Figure 8B:
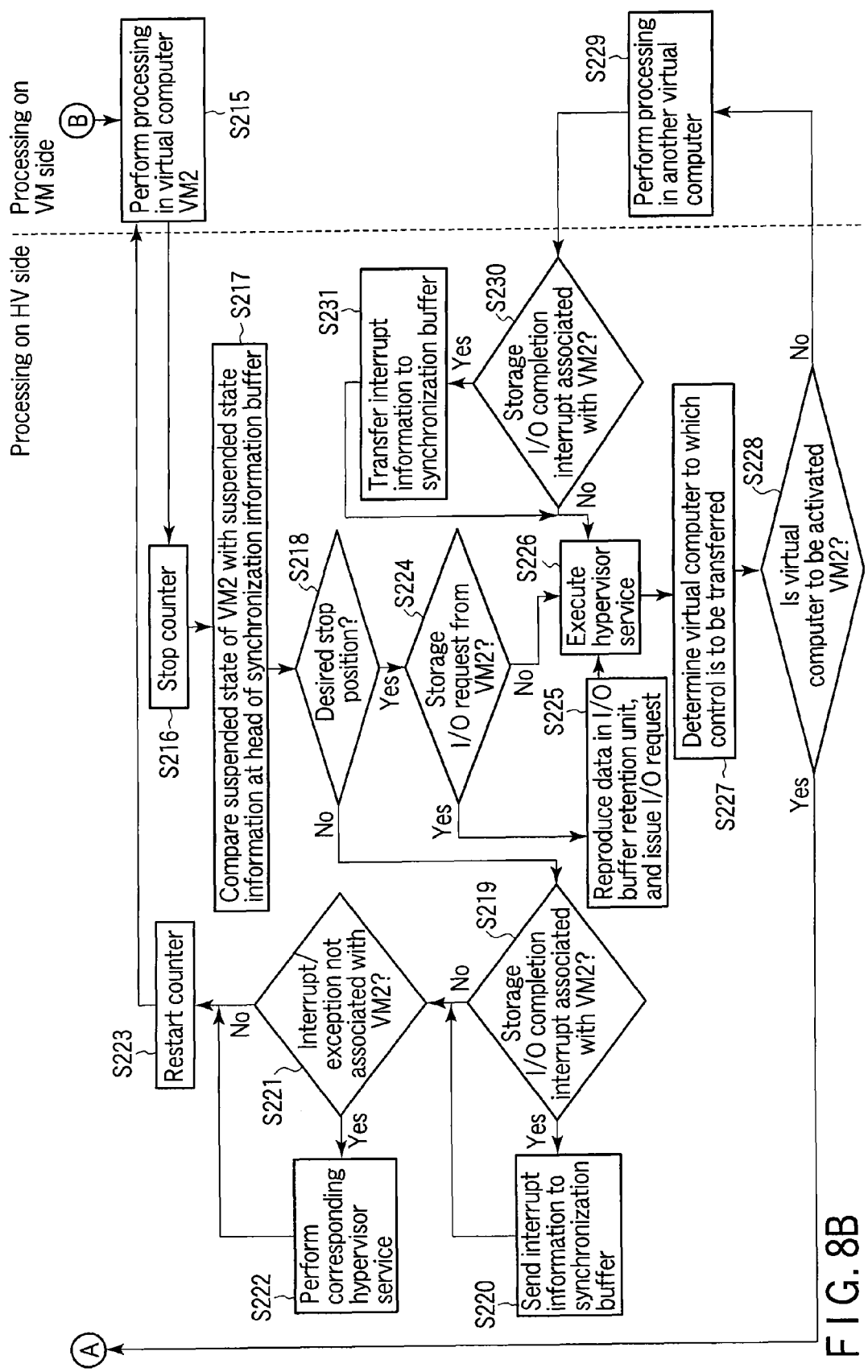
FIG. 8B is a flowchart showing an example of an operation procedure of a hypervisor in the server computer on the clone side.

FIGS. 8A and 8B show an example of the operation procedure of the clone hypervisor 200.

It should be noted that in FIGS. 8A and 8B, a reference symbol HV1 denotes the main hypervisor 100; VM1, the main virtual computer 150; and VM2, the clone virtual computer 250.

Further, it is assumed that the synchronization information received from the main hypervisor 100 is stored in the synchronization information buffer (queue).

It should be noted that although FIGS. 8A and 8B exemplify the second method in which the interrupt handler call is made to wait until the I/O completion interrupt from the clone virtual storage device is caught, the first method can also be employed.

In the clone hypervisor 200, upon receipt of a generation notification of the main virtual computer 150 from the main hypervisor 100 (step S201), the hypervisor service execution unit 208 generates the clone virtual computer 250 (step S202).

Subsequently, the restored state setting unit 209 extracts and inspects the restored state at the head of the synchronization information buffer (steps S203, and S204).

When the state at the time of the restoration is the restoration from the hypervisor call, the restored state setting unit 209 performs preparation for the response request corresponding to the hypervisor call (step S205), and advances to step S206.

When the state at the time of the restoration is an exception, the restored state setting unit 209 performs preparation for the exception handler call (step S207), and advances to step S206.

When the state at the time of the restoration is the restoration from the interrupt, if the type of the interrupt is the I/O completion interrupt from the storage device (step S208), coincidence of the I/O completion interrupt from the storage device and the I/O completion interrupt from the clone virtual storage device 240 is waited (step S209), if the type of the interrupt is the read request, read data retained in the I/O buffer retention unit 213 is prepared (step S210), vector information included in the synchronization information is referred to, the interrupt handler call is prepared including the read data prepared in step S210 (step S211), and then the flow is advanced to step S206. It should be noted that in step S210, even in the case of the I/O completion interrupt corresponding to the storage write request, even when the write data retained in the I/O buffer retention unit 213 is prepared, this preparation of the write data does not affect the future operation, and hence even in the case of the I/O completion interrupt corresponding to the write request for simplification of the processing description, the processing of step S210 may be performed. When the type of the interrupt is not the I/O completion interrupt from the storage device (step S208), the wait is not performed, the vector information included in the synchronization information is referred to, the interrupt handler call is prepared (step S211), and then the flow is advanced to step S206.

Then, in step S206, the suspended state comparison unit 207 extracts and inspects the suspended state at the head of the synchronization information buffer (steps S206, and S212).

When the suspended state is an interrupt, the breakpoint setting unit 210 sets a breakpoint to cause a stop at the interrupt occurrence position on the main side (step S213), starts counting, and transfers the control to the clone virtual computer 250 (step S214). When the suspension information is a hypervisor call or exception, the breakpoint is not set, and the control is transferred to the clone virtual computer 250 (step S214).

Here, the flow is temporarily shifted to the processing in the clone virtual computer 250 (step S215). Further, when the processing in the clone virtual computer 250 is suspended, the processing is returned to the clone hypervisor 200.

When the processing is returned to the clone hypervisor 200, the counter is stopped (step S216), and the suspended state comparison unit 207 compares the suspended state of the clone virtual computer 250 and the suspended state information of the head of the synchronization information buffer with each other (steps S217 and S218). Here, even when a storage I/O completion interrupt associated with the clone virtual computer 250 (step S219), and an interrupt or exception which is not associated with the clone virtual computer 250 occur (step S221), it can be said that the suspension does not occur at the desired stop position.

As a result of the comparison, when the suspended states are not obtained at the desired stop position, the counter is restarted (step S223), and the flow is returned to the processing in the clone virtual computer 250 (step S215). Here, in the case of the storage I/O completion interrupt associated with the clone virtual computer 250 (step S219), the interrupt information is sent to the synchronization buffer (step S220). In the case of the I/O completion interrupt of the most recent object to be waited, the wait in step S209 is cancelled, and in the case of no I/O completion interrupt of the most recent object to be waited, the interrupt information is retained in the I/O buffer retention unit 213, and the interrupt is held. Further, in the case of the interrupt or exception not associated with the clone virtual computer 250 (step S221), hypervisor service processing corresponding to the interrupt or exception is performed (step S222), the counter of the clone virtual computer 250 is restarted (step S223), and the flow is returned to the processing in the clone virtual computer 250 (step S215).

As a result of the comparison, when the suspended states are obtained at the desired stop position, the flow is shifted to the processing in the clone hypervisor 200 (step S226). The processing in the clone hypervisor 200 is performed by the hypervisor service execution unit 208. Here, when the suspended states are the hypervisor calls, and are the storage I/O requests (step S224), the I/O object data is reproduced in the I/O buffer retention unit 213, and an I/O request is issued (step S225).

Now, subsequently to step S226, the hypervisor service execution unit 208 determines a virtual computer to which the control is to be transferred (step S227).

When the virtual computer to be started is not the clone virtual computer 250, and is the other virtual computer (step S228), the processing in the virtual computer is temporarily performed (step S229), then the processing in the virtual computer is suspended in a short time, and the flow is returned to the processing in the clone hypervisor 200 of step S226. After this, the processing from step S227 is repeated. Here, when the suspension factor of the virtual computer is a storage I/O completion interrupt associated with the clone virtual computer 250 (step S230), as in step S220, the interrupt information is transferred to the synchronization buffer (step S231). When the suspension factor is an I/O completion interrupt of the most recent object to be waited, the wait in step S209 is cancelled, when the suspension factor is not an I/O completion interrupt of the most recent object to be waited, the interrupt information is retained in the I/O buffer retention unit 213, and the interrupt is held. Further, the flow is returned to the processing in the clone hypervisor 200 of step S226. After this, the processing from step S227 is repeated.

When the virtual computer to be started is the clone virtual computer 250 (step S228), the flow is returned to step S203, and the processing that has been performed so far is repeated.

In the following, the processing of writing to the storage device, and the processing of reading from the storage device will be described along the flow of the processing.

First, processing of storage write I/O request issuance will be described below.

Figure 9:
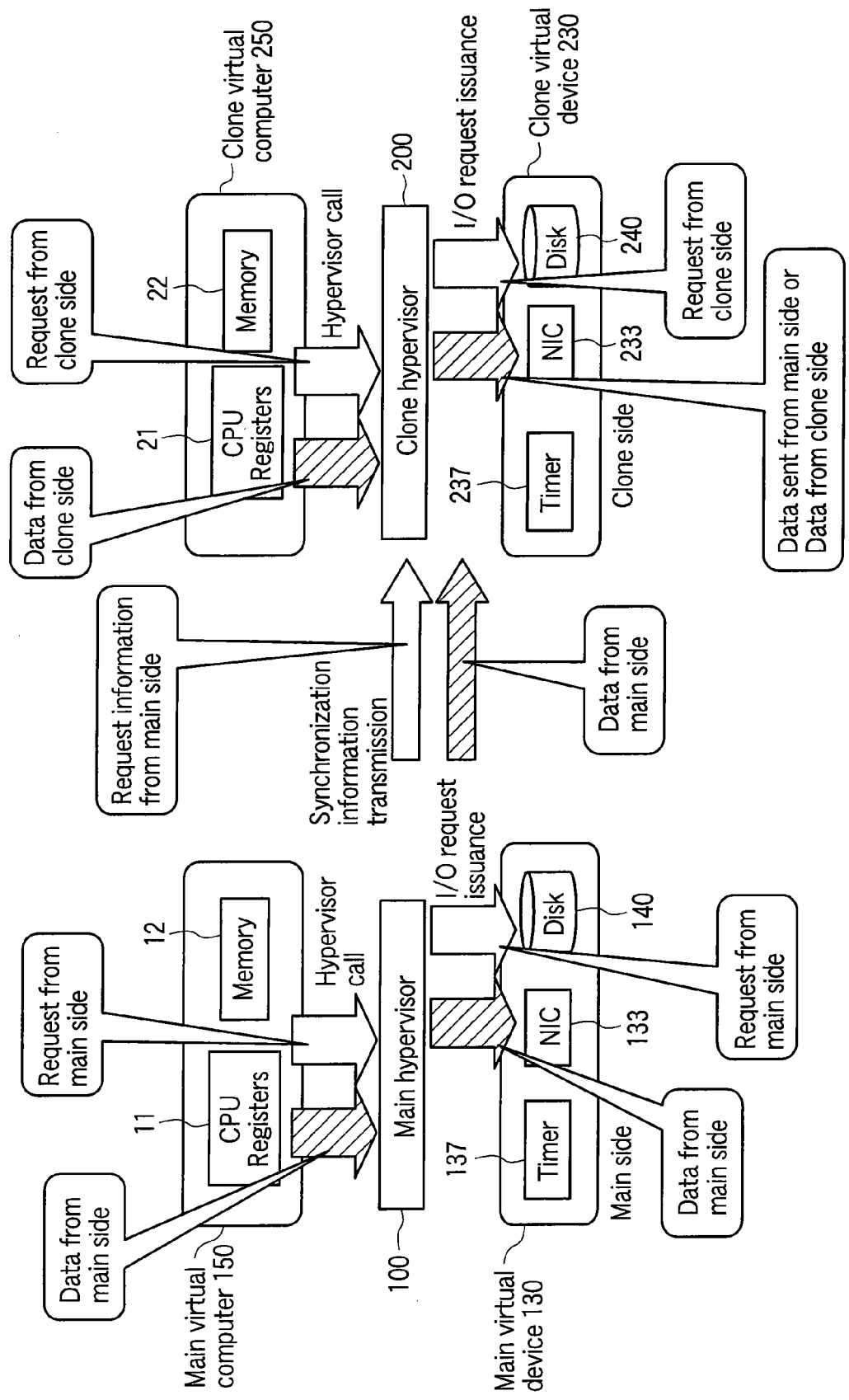
FIG. 9 is a view for explaining the processing of issuing an I/O request for write to the storage.

FIGS. 9 and 10 show an outline of the processing of storage write I/O request issuance.

FIG. 9 exemplifies a case of the write request issuance. It should be noted that in FIG. 9, write data may be sent from the main hypervisor 100 to the clone hypervisor 200, instead, a hash value or the like of data may be sent, or the data or value may not be sent. Further, as data to be written to the clone virtual storage device 240, one of the data from the clone virtual computer 250 and data from the main hypervisor 100 may be used (however, when data is not sent from the main side to the clone side, data from the clone virtual computer 250 is used).

FIG. 10 exemplifies a case of response value input. It should be noted that in FIG. 10, as the response value input of a hypervisor call to the clone virtual computer 250, one of a response value obtained by the clone hypervisor 200, and a response value from the main hypervisor 100 may be used.

Now, first, a write request hypervisor call is performed in the main virtual computer 150. The main hypervisor 100 issues a write I/O request to the main virtual storage device 140, and transmits write request information to the clone hypervisor 200 as synchronization information. The clone hypervisor 200 confirms that the processing of the clone virtual computer 250 is suspended by the write request hypervisor call, and issues a write I/O request to the clone virtual storage device 240 on the basis of the write request information issued by the clone virtual computer 250. Further, the clone hypervisor 200 receives synchronization information of a response value input for the hypervisor call from the main hypervisor 100, and inputs a response value of the write I/O request issued to the clone virtual storage device 240 to the clone virtual computer 250.

Here, the write data itself may not be included in the synchronization information sent from the main hypervisor 100 in order to issue a write I/O request to the clone virtual storage device 240 on the basis of the write request information issued by the clone virtual computer 250.

Further, if the transition of the execution state of the main virtual computer 150, and the transition of the execution state of the clone virtual computer 250 are identical with each other, the write request hypervisor call information from the main virtual computer 150, and the write request hypervisor call information from the clone virtual computer 250 ought to become identical with each other. Accordingly, as the contents (write data) of the write I/O request issued by the clone hypervisor 200, the contents of the synchronization information sent from the main hypervisor 100 may be used.

Further, in order to verify that the transition of the execution state of the main virtual computer 150, and the transition of the execution state of the clone virtual computer 250 are identical with each other, the contents of the write data included in the synchronization information and the contents of the write data included in the write I/O request information issued from the clone virtual computer 250 may be collated with each other by calculating hash values or the like. When the write data items are collated with each other, the write data itself may not be included in the synchronization information, calculation of the hash values or the like may be performed by the main hypervisor 100, and only the hash values or the like may be included in the synchronization information.

Further, if the transition of the execution state and the storage state of the main virtual computer 150, and the transition of the execution state and the storage state of the clone virtual computer 250 are identical with each other, the response values corresponding to the hypervisor calls ought to become identical with each other. Accordingly, the response value included in the synchronization information sent from the main hypervisor 100 may be input as the response to the hypervisor call of the storage I/O request to the clone virtual computer 250 in step S205 of FIG. 8A.

Further, in order to verify that the transition of the execution state of the main virtual computer 150, and the transition of the execution state of the clone virtual computer 250 are identical with each other, the response information to the hypervisor call included in the synchronization information sent from the main hypervisor 100, and the response information at the time when the write I/O is issued to the clone virtual storage device 240 may be collated with each other.

Next, the processing of the write I/O completion interrupt from the storage device will be described below.

Figure 11:
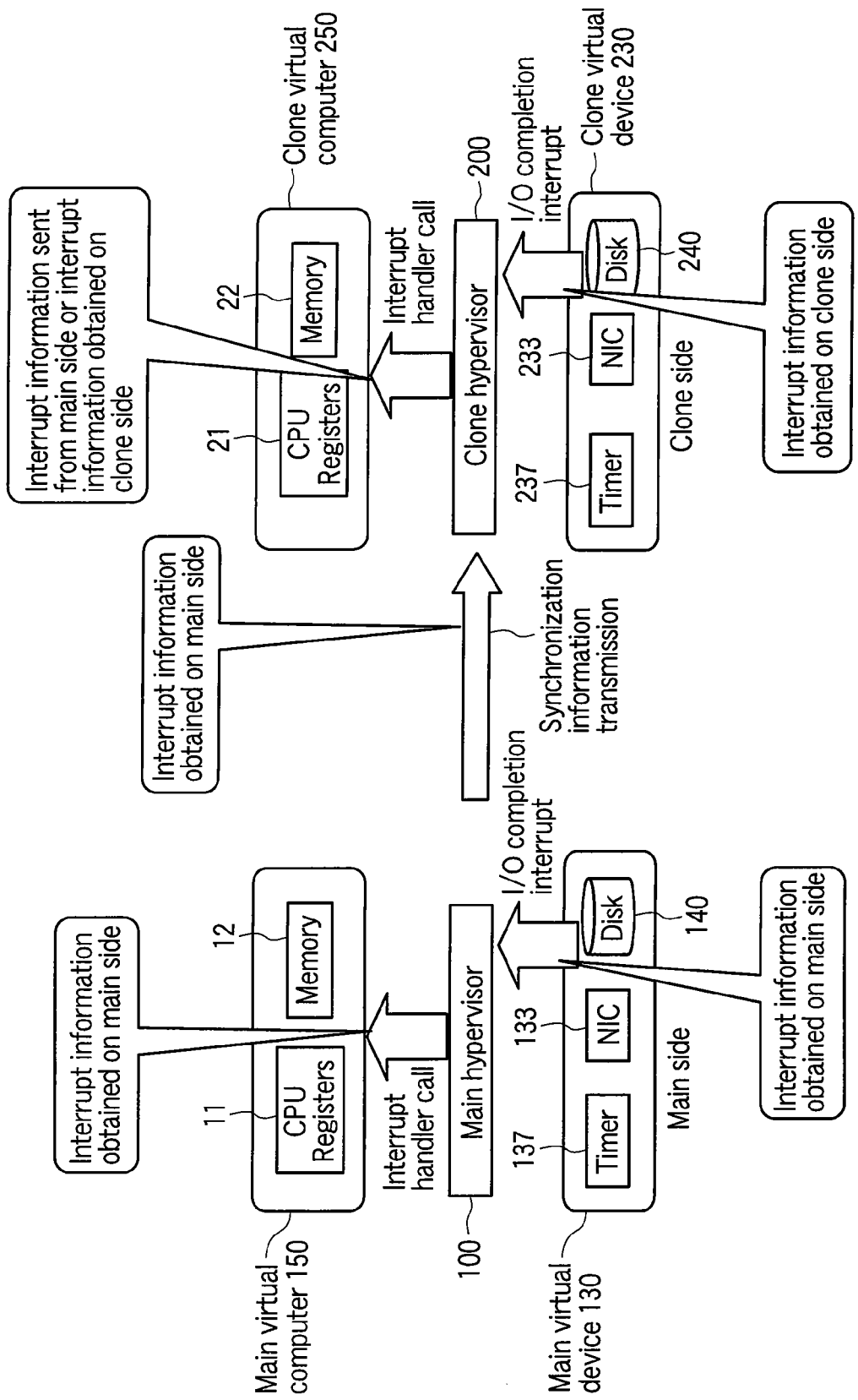
FIG. 11 is a view for explaining the processing of I/O completion interrupt of write from the storage.

FIG. 11 shows an outline of the processing of a write I/O completion interrupt from the storage device. It should be noted that in FIG. 11, in the interrupt handler call directed to the clone virtual computer 250, one of the interrupt information obtained by the clone hypervisor 200, and the interrupt information from the main hypervisor 100 may be used.

Now, a write I/O request is issued to each of the main virtual storage device 140 and clone virtual storage device 240, and hence an I/O completion interrupt occurs in each of the main virtual storage device 140 and clone virtual storage device 240. In order to apply an interrupt handler call to the clone virtual computer 250 at the timing at which an interrupt handler call is applied to the main virtual computer 150, it is necessary to wait for the coincidence of the synchronization information (interrupt information) sent from the main hypervisor 100 and the I/O completion interrupt information from the clone virtual storage device 240, and input the interrupt information to the clone virtual computer 250 at the timing at which the interrupt occurs in the main virtual computer 150 (included in the synchronization information).

Here, if the transition of the execution state and the storage state of the main virtual computer 150, and the transition of the execution state and the storage state of the clone virtual computer 250 are identical with each other, the I/O completion interrupt information items ought to become identical with each other. Accordingly, as the information associated with the interrupt handler call to be input to the clone virtual computer 250, that information included in the synchronization information sent from the main hypervisor 100 may be used.

Further, in order to verify that the transition of the execution state of the main virtual computer 150, and the transition of the execution state of the clone virtual computer 250 are identical with each other, the interrupt information included in the synchronization information, and the interrupt information from the clone virtual storage device 240 may be collated with each other.

Next, the processing of issuing a read I/O request for read from the storage device will be described below.

Figure 13:
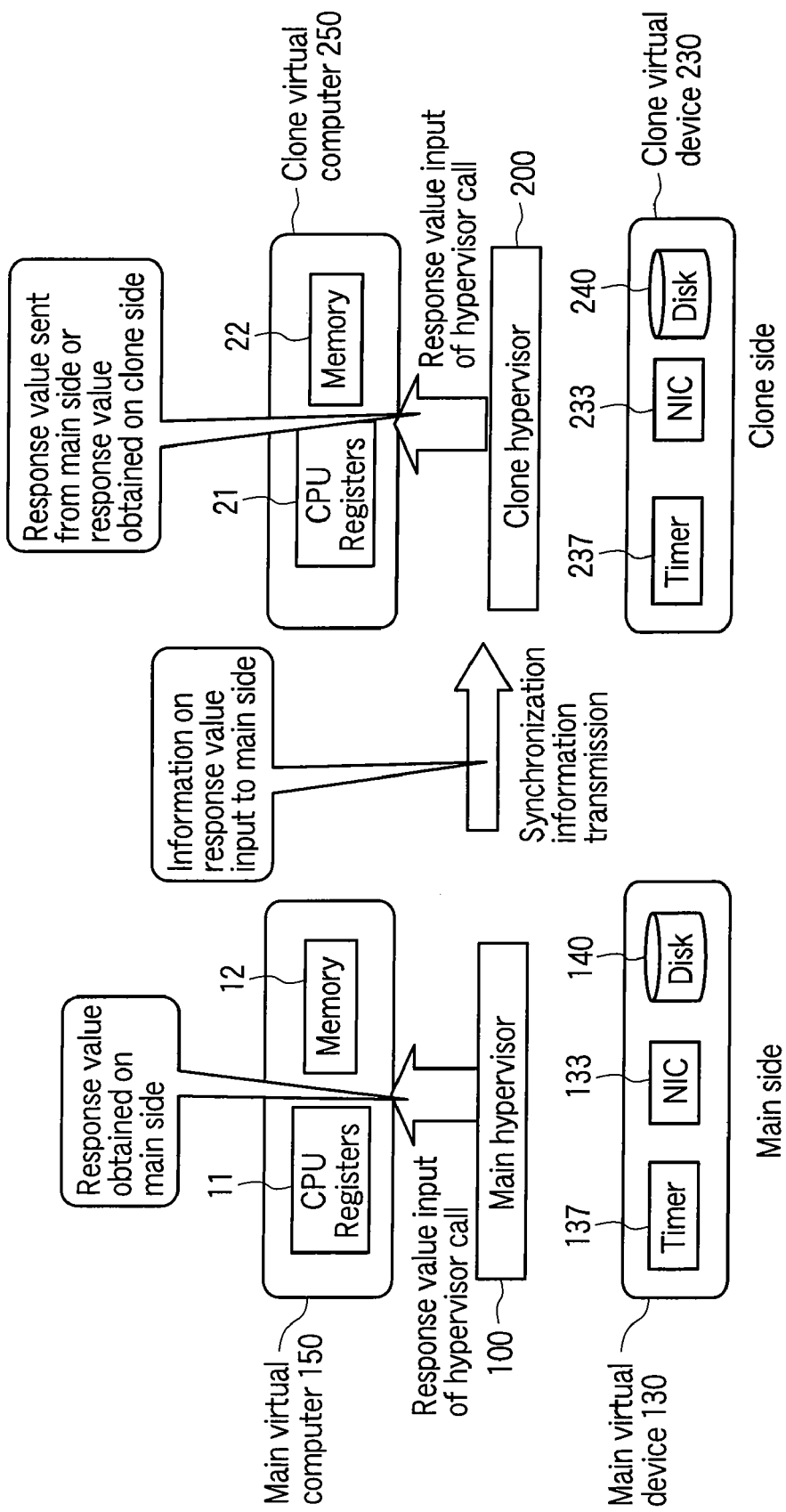
FIG. 13 is a view for explaining the processing of issuing an I/O request for read from the storage.

FIGS. 12 and 13 show an outline of the processing of issuing a read I/O request for read from the storage device.

FIG. 12 exemplifies a case of read request issuance. It should be noted that in FIG. 12, the I/O request may be or may not be issued to the clone virtual storage device 240.

FIG. 13 exemplifies a case of inputting a response value. It should be noted that in FIG. 13, in inputting the response value for the hypervisor call to the clone virtual computer 250, one of the response value obtained by the clone hypervisor 200, and the response value from the main hypervisor 100 may be used (however, when an I/O request is not issued in FIG. 12, the response value from the main hypervisor 100 is used).

Now, first, a hypervisor call of the read request is performed in the main virtual computer 150. The main hypervisor 100 issues a read I/O request to the storage device, and transmits read request information to the clone hypervisor 200 as the synchronization information. The clone hypervisor 200 confirms that the processing of the clone virtual computer 250 is suspended by the read request hypervisor call, and issues a read I/O request to the clone virtual storage device 240 on the basis of the read request information issued by the clone virtual computer 250. Further, the clone hypervisor 200 receives the synchronization information of the response value input corresponding to the hypervisor call from the main hypervisor 100, and inputs the response value of the read I/O request issued to the clone virtual storage device 240 to the clone virtual computer 250.

Here, in order to verify that the transition of the execution state of the main virtual computer 150, and the transition of the execution state of the clone virtual computer 250 are identical with each other, the read request information included in the synchronization information, and the read request information issued from the clone virtual computer 250 may be collated with each other.

Further, the read request, even when not issued to the clone virtual storage device 240, does not affect the contents of the storage device. Accordingly, the read request may not be issued to the clone virtual storage device 240, and in steps S209 and S210 in FIG. 8A, as the information necessary for the interrupt handler call to be input to the clone virtual computer 250, that of the information included in the synchronization information may be used.

Further, if the transition of the execution state and the storage state of the main virtual computer 150, and the transition of the execution state and the storage state of the clone virtual computer 250 are identical with each other, the response values corresponding to the hypervisor calls ought to become identical with each other. Accordingly, the response value included in the synchronization information sent from the main hypervisor 100 may be input as the response to the hypervisor call of the storage I/O request to the clone virtual computer 250 in step S205 of FIG. 8A.

Further, in order to verify that the transition of the execution state of the main virtual computer 150, and the transition of the execution state of the clone virtual computer 250 are identical with each other, the response information to the hypervisor call included in the synchronization information sent from the main hypervisor 100, and the response information at the time when the read I/O is issued to the clone virtual storage device 240 may be collated with each other.

Next, the processing of a read I/O completion interrupt from the storage device will be described below.

Figure 15:
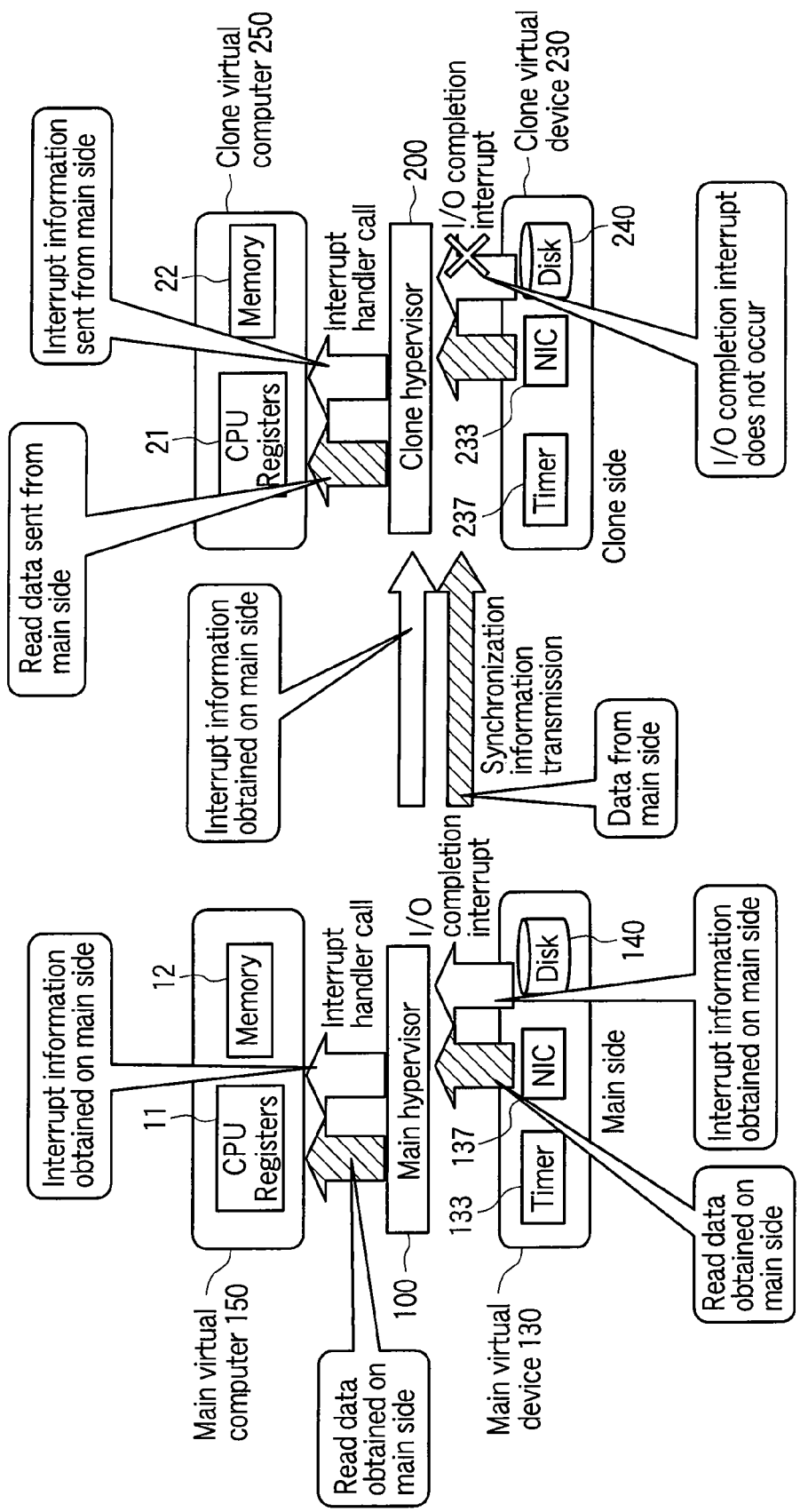
FIG. 15 is a view for explaining the processing of I/O completion interrupt of read from the storage.

FIGS. 14 and 15 show an outline of the processing of a read I/O completion interrupt from the storage device.

FIG. 14 exemplifies a case where a read I/O request is issued to the clone virtual storage device 240 in FIG. 12. It should be noted that in FIG. 14, the read data may be sent from the main hypervisor 100 to the clone hypervisor 200, instead, a hash value or the like of data may be sent, or the data or value may not be sent. Further, in the interrupt handler call directed to the clone virtual computer 250, one of the interrupt information obtained by the clone hypervisor 200, and the interrupt information from the main hypervisor 100 may be used, further, one of the read data obtained by the clone hypervisor 200, and the read data from the main hypervisor 100 may also be used (however, when data is not sent from the main side to the clone side, the interrupt information obtained by the clone hypervisor 200 is used).

FIG. 15 exemplifies a case where the read I/O request is not issued to the clone virtual storage device 240 in FIG. 12. It should be noted that in FIG. 15, it is necessary to send the read data from the main hypervisor 100 to the clone hypervisor 200. Further, in the interrupt handler call directed to the clone virtual computer 250, the interrupt information/read data from the main hypervisor 100 is used. It should be noted that the I/O completion interrupt does not occur, and hence the wait for the I/O completion interrupt occurrence is unnecessary.

Now, a read I/O request is issued to each of the main virtual storage device 140 and clone virtual storage device 240, and hence an I/O completion interrupt occurs in each of the main virtual storage device 140 and clone virtual storage device 240. In order to apply an interrupt handler call to the clone virtual computer 250 at the timing at which an interrupt handler call is applied to the main virtual computer 150, it is necessary to wait for the coincidence of the synchronization information (interrupt information) sent from the main hypervisor 100 and the I/O completion interrupt information from the clone virtual storage device 240, and input the interrupt information to the clone virtual computer 250 at the timing at which the interrupt occurs in the main virtual computer 150 (included in the synchronization information).

Here, if the transition of the execution state and the storage state of the main virtual computer 150, and the transition of the execution state and the storage state of the clone virtual computer 250 are identical with each other, the read data items from the storage devices ought to become identical with each other. Accordingly, as the read data to be input to the clone virtual computer 250, the read data included in the synchronization information sent from the main hypervisor 100 may be used.

Further, in order to verify that the transition of the execution state of the main virtual computer 150, and the transition of the execution state of the clone virtual computer 250 are identical with each other, the contents of the read data included in the synchronization information and the contents of the read data included in the information on the read I/O completion interrupt that has occurred in the clone virtual storage device 240 may be collated with each other by calculating hash values or the like. When the read data items are collated with each other, the read data itself may not be included in the synchronization information, calculation of the hash values or the like may be performed by the main hypervisor 100, and only the hash values or the like may be included in the synchronization information.

Further, the read request, even when not issued to the clone virtual storage device 240, does not affect the contents of the storage device. Accordingly, as the information necessary for the interrupt handler call to be input to the clone virtual computer 250, that of the information included in the synchronization information may be used, and in step S225 in FIG. 8B, the read request may not be issued to the clone virtual storage device 240. In this case, the I/O completion interrupt from the clone virtual storage device 240 does not occur, and hence the processing of the wait for the I/O completion interrupt need not be performed.

Further, if the transition of the execution state and the storage state of the main virtual computer 150, and the transition of the execution state and the storage state of the clone virtual computer 250 are identical with each other, the I/O completion interrupt information items ought to become identical with each other. Accordingly, as the information associated with the interrupt handler call to be input to the clone virtual computer 250, that information included in the synchronization information sent from the main hypervisor 100 may be used.

Further, in order to verify that the transition of the execution state of the main virtual computer 150, and the transition of the execution state of the clone virtual computer 250 are identical with each other, the interrupt information included in the synchronization information, and the interrupt information from the clone virtual storage device 240 may be collated with each other.

As has been described above, according to this embodiment, execution states of virtual computers operating on two independent computers become identical with each other, and the contents of the storages also become identical with each other, whereby duplexing is achieved. This enables, even when the computer on which the main virtual computer operates or the storage is stopped by a failure or the like, the clone virtual computer to continue the same processing, whereby the failure can be concealed. In this way, by virtue of this embodiment, it is possible to improve the availability of the virtual computer and storage.

Note that the respective functions described above can be implemented by causing a computer having a proper mechanism as software to perform processing.

In addition, this embodiment can be implemented as a program for causing a computer to execute a predetermined sequence, causing the computer to function as predetermined means, or causing the computer to implement predetermined functions. In addition, the embodiment can be implemented as a computer-readable recording medium on which the program is recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high availability system comprising a first server computer and a second server computer, the first server computer including a first virtual computer which executes a processing and a first hypervisor which manages a first virtual storage and the first virtual computer, and the second server computer including a second virtual computer which executes the processing behind from the first virtual computer and a second hypervisor which manages a second virtual storage and the second virtual computer, wherein the first hypervisor comprising:
an acquisition unit configured to acquire synchronization information associated with an event, wherein the event occurs during execution of the processing by the first virtual computer and the event provides an input to the first virtual computer; and
a transmission unit configured to transmit the synchronization information to the second hypervisor, and the second hypervisor comprising:
a reception unit configured to receive the synchronization information from the first hypervisor; and
a control unit configured to perform control in accordance with the synchronization information in such a manner that the execution state of the second virtual computer associated with an input thereto becomes identical with the execution state of the first virtual computer associated with an input thereto, and
the control unit performs control associated with the synchronization information, when the event associated with the synchronization information is predetermined one of an I/O completion interrupt from the first virtual storage, and an interrupt handler call corresponding to the interrupt, after the synchronization information is received, and an I/O completion interrupt from the second virtual storage corresponding to the I/O completion interrupt is caught.

2. The system according to claim 1, wherein
when there are a plurality of I/O completion interrupts from the second virtual storage to be caught, the control unit performs the control associated with the synchronization information in the order of I/O completion interrupts from the first virtual storage received by the first virtual computer irrespectively of the order in which the I/O completion interrupts from the second virtual storage are caught.

3. The system according to claim 2, wherein
when there are the plurality of I/O completion interrupts to be caught, and when, in the first hypervisor, a second I/O completion interrupt is caught after a first I/O completion interrupt is caught, and in the second hypervisor, I/O completion interrupts are caught in the order reverse to that in the first hypervisor, the control unit holds the information associated with the second I/O completion interrupt in a temporary buffer until at least the first I/O completion interrupt is caught.

4. The system according to claim 1, wherein
the control unit, when an event associated with the synchronization information is a read request to the first virtual storage, does not issue a read request corresponding to the read request to the second virtual storage, and
when the event associated with the synchronization is an I/O completion interrupt from the first virtual storage corresponding to the read request to the first virtual storage, if the synchronization information is received, performs the control associated with the synchronization information without waiting for the I/O completion interrupt from the second virtual storage.

5. The system according to claim 1, wherein
when the event is an interrupt handler call corresponding to the I/O completion interrupt from the first virtual storage corresponding to the read request to the first virtual storage, the acquisition unit includes the read data in the synchronization information, or omits the read data, and
the control unit, in executing the interrupt handler call corresponding to the I/O completion interrupt from the second virtual storage corresponding to the read request to the second virtual storage with respect to the second virtual computer, when the read data is included in the synchronization information, uses one of the read data included in the synchronization information, and the read data from the second virtual storage as the read data, and when the read data is not included in the synchronization information, uses the read data from the second virtual storage as the read data.

6. The system according to claim 1, wherein
when the event is the interrupt handler call corresponding to the I/O completion interrupt from the first virtual storage corresponding to the read request to the first virtual storage, the acquisition unit includes the read data in the synchronization information, and
the control unit, in executing the interrupt handler call corresponding to the I/O completion interrupt from the second virtual storage corresponding to the read request to the second virtual storage with respect to the second virtual computer, when the read request corresponding to the read request to the first virtual storage has been issued to the second virtual storage, uses one of the read data included in the synchronization information, and the read data from the second virtual storage as the read data, and when the read request corresponding to the read request to the first virtual storage has not been issued to the second virtual storage, uses the read data included in the synchronization information as the read data.

7. The system according to claim 1, wherein
when the event is the write request to the first virtual storage, the acquisition unit includes the write data in the synchronization information, or omits the write data, and
the control unit, in issuing the write request corresponding to the write request to the first virtual storage to the second virtual storage, when the write data is included in the synchronization information, uses one of the write data included in the synchronization information, and the write data from the second virtual computer as the write data, and when the write data is not included in the synchronization information, uses the write data from the second virtual computer as the write data.

8. The system according to claim 1, wherein
the transmission unit transmits the plurality of synchronization information items in the order in which events associated with the synchronization information items have occurred, or adds order information which makes it possible to specify the order in which the events associated with the synchronization information items have occurred to the synchronization information items, and transmits the resultant information items.

9. The system according to claim 8, wherein
the control unit performs control in such a manner that the same plurality of events as the plurality of events which have occurred with respect to the first virtual computer occur with respect to the second virtual computer in the same order as the order in which the plurality of events have occurred with respect to the first virtual computer by referring to the plurality of synchronization information items in the order in which the synchronization information items have been received or in the occurrence order specified by the order information included in the synchronization information items.

10. The system according to claim 1, wherein the acquisition unit determines whether a timing at which the event occurs is nondeterministic or deterministic, and inserts, into the synchronization information, timing information for specifying a timing at which the event has occurred, when determining that the timing is nondeterministic.

11. The system according to claim 10, wherein the control unit performs control to cause an event identical to the event which has occurred in the first virtual computer to occur in the second virtual computer at the same timing as that in the first virtual computer in accordance with the synchronization information when a timing at which an event associated with timing information inserted in the synchronization information occurs is nondeterministic.

12. The system according to claim 10, which further comprises a counter control unit configured to clear a counter which holds an executed instruction count indicating the number of instructions executed when control is transferred from the first hypervisor to the first virtual computer, count the number of instructions executed afterward, and stop counting the executed instruction count when control is transferred from the first virtual computer to the first hypervisor, and in which
the acquisition unit sets, as the timing information, an executed instruction count indicated by the counter when counting stops upon determining that a timing at which an event which has occurred when control is transferred from the first virtual computer to the first hypervisor is nondeterministic if the event is an interrupt associated with the first virtual computer.

13. The system according to claim 12, wherein when control is transferred from the first hypervisor to the first virtual computer, the counter control unit restarts the counter instead of clearing the counter if an event which has occurred when control is transferred from the first virtual computer to the first hypervisor is an interrupt which is not associated with the first virtual computer.

14. The system according to claim 12, wherein the control unit sets a breakpoint for causing an event identical to that associated with the synchronization information to occur in an instruction sequence executed by the second virtual computer in accordance with the executed instruction count included in the synchronization information.

15. The system according to claim 1, wherein the acquisition unit acquires the synchronization information about the event when processing in the first virtual computer is suspended and control is transferred to the first hypervisor, and when control restored from the first hypervisor to the first virtual computer.

16. The system according to claim 1, wherein the acquisition unit inserts a type of hypervisor call and argument information into the synchronization information associated with a time of suspension of processing in the first virtual computer when the event is hypervisor call.

17. The system according to claim 16, wherein the acquisition unit inserts response information of hypervisor call and information of a response route into the synchronization information associated with a time of restoration to processing in the first virtual computer when the event is hypervisor call.

18. The system according to claim 1, wherein the acquisition unit inserts identification information of a virtual computer in which an interrupt handler is activated, interrupt information, and interrupt position information into the synchronization information associated with a time of suspension of processing in the first virtual computer when the event is an interrupt.

19. The system according to claim 18, wherein the acquisition unit inserts information associated with interrupt handler call into the synchronization information associated with a time of restoration to processing in the first virtual computer when the event is an interrupt.

20. An execution state control method for a high availability system comprising a first server computer and a second server computer, the first server computer including a first virtual computer which executes a processing and a first hypervisor which manages a first virtual storage and the first virtual computer, and the second server computer including a second virtual computer which executes the processing behind from the first virtual computer and a second hypervisor which manages a second virtual storage and the second virtual computer, the method comprising:
acquiring, in a first hypervisor, synchronization information associated with an event, wherein the event occurs during execution of the processing by the first virtual computer and the event provides an input to the first virtual computer;
transmitting, by the first hypervisor, the synchronization information to the second hypervisor;
receiving, by the second hypervisor, receive the synchronization information from the first hypervisor;
performing, by the second hypervisor, control in accordance with the synchronization information in such a manner that the execution state of the second virtual computer associated with an input thereto becomes identical with the execution state of the first virtual computer associated with an input thereto; and performing, by the second hypervisor, control associated with the synchronization information, when the event associated with the synchronization information is predetermined one of an I/O completion interrupt from the first virtual storage, and an interrupt handler call corresponding to the interrupt, after the synchronization information is received, and an I/O completion interrupt from the second virtual storage corresponding to the I/O completion interrupt is caught.

* * * * *